(12) United States Patent
Hintz et al.

(10) Patent No.: US 8,981,710 B2
(45) Date of Patent: Mar. 17, 2015

(54) ENERGY MANAGEMENT SYSTEM

(75) Inventors: Andrew Stephen Hintz, Avon, IN (US); Quentin Wayne Kramer, Carmel, IN (US)

(73) Assignee: Indy Power Systems LLC, Carmel, IN (US)

( * ) Notice: Subject to any disclaimer, the term of this patent is extended or adjusted under 35 U.S.C. 154(b) by 1111 days.

(21) Appl. No.: 12/885,999

(22) Filed: Sep. 20, 2010

(65) Prior Publication Data

US 2012/0068537 A1    Mar. 22, 2012

(51) Int. Cl.
*H02J 7/00* (2006.01)
*H02M 3/158* (2006.01)
(Continued)

(52) U.S. Cl.
CPC ........... *H02M 3/1582* (2013.01); *B60L 11/005* (2013.01); *B60L 11/1805* (2013.01); *B60L 11/1842* (2013.01); *B60L 11/1844* (2013.01); *B60L 11/1864* (2013.01); *B60L 11/1887* (2013.01); *H02J 7/0054* (2013.01); *H02J 2007/0059* (2013.01); *Y02T 10/7022* (2013.01); *Y02T 10/7061* (2013.01); *Y02T 10/7088* (2013.01); *Y02T 90/127* (2013.01); *Y02T 90/128* (2013.01); *Y02T 90/14* (2013.01);
(Continued)

(58) Field of Classification Search
CPC ....... H02J 7/008; H02J 7/0031; H02J 7/0054; H02J 2007/0059; H01M 10/441
USPC .................. 320/103, 126, 132, 134, 142, 163
See application file for complete search history.

(56) References Cited

U.S. PATENT DOCUMENTS

| 3,463,995 | A | 8/1969 | Herold |
| 4,025,860 | A | 5/1977 | Shibata |
| 4,277,737 | A | 7/1981 | Muller |

(Continued)

FOREIGN PATENT DOCUMENTS

JP    09056007 A    2/1997

OTHER PUBLICATIONS

Cleveland, Terry; "Bi-Directional, Portable, Power-Management System for Multi-Cell, Li-Ion Battery Pack Applications"; Microchip Technology, Inc.; Battery Power Products & Technology:Solutions for OEM Design Engineers, Integrators & Specifiers of Power Management Products; vol. 11, Issue 2; www.BatteryPowerOnline.com; Mar./Apr. 2007.

*Primary Examiner* — Edward Tso
*Assistant Examiner* — Aaron Piggush
(74) *Attorney, Agent, or Firm* — Taft Stettinius & Hollister LLP; Anthony P. Filomena, II

(57) ABSTRACT

An energy management system and method connecting a load to multiple energy sources. The system includes a load connection, source connections for each energy source, a control unit and at least one energy management module having an inductor and four switches. The first source is in parallel with the load. The first switch couples the first source positive terminal to the first inductor end, second switch couples the first source negative terminal to the first inductor end, third switch couples the second source positive terminal to the second inductor end, and fourth switch couples the second source negative terminal to the second inductor end. The control unit controls the four switches of each module to transfer energy between the energy sources through the module inductor. The system can have more than two sources. Modes including one or two switch, synchronous or asynchronous, and buck or boost can be used.

22 Claims, 19 Drawing Sheets

(51) Int. Cl.
*B60L 11/00* (2006.01)
*B60L 11/18* (2006.01)

(52) U.S. Cl.
CPC .............. *Y02T 90/163* (2013.01); *Y02T 90/34* (2013.01); *Y04S 10/126* (2013.01); *Y02E 60/721* (2013.01)
USPC ........................... 320/103; 320/134; 320/163

(56) References Cited

U.S. PATENT DOCUMENTS

| | | |
|---|---|---|
| 4,345,197 A | 8/1982 | Wheadon |
| 4,348,628 A | 9/1982 | Loucks |
| 4,689,531 A | 8/1987 | Bacon |
| 4,849,682 A | 7/1989 | Bauer et al. |
| 5,767,658 A | 6/1998 | Hayes |
| 5,808,448 A | 9/1998 | Naito |
| 5,896,022 A | 4/1999 | Jacobs |
| 5,910,722 A | 6/1999 | Lyons |
| 6,184,659 B1 | 2/2001 | Darmawaskita |
| 6,229,279 B1 | 5/2001 | Dierker |
| 6,232,674 B1 | 5/2001 | Frey et al. |
| 6,320,358 B2 | 11/2001 | Miller |
| 6,331,365 B1 | 12/2001 | King |
| 6,507,506 B1 | 1/2003 | Pinas et al. |
| 6,515,872 B2 | 2/2003 | Nakayama |
| 6,577,099 B2 | 6/2003 | Kruger |
| 6,583,602 B2 | 6/2003 | Imai |
| 6,661,108 B1 | 12/2003 | Yamada |
| 6,680,600 B2 | 1/2004 | Emori |
| 6,713,988 B2 | 3/2004 | Dubac |
| 6,866,107 B2 | 3/2005 | Heinzmann |
| 6,879,057 B1 | 4/2005 | Pinas et al. |
| 6,886,647 B1 | 5/2005 | Gotta |
| 7,084,525 B2 * | 8/2006 | Rajashekara et al. ........... 307/82 |
| 7,154,237 B2 | 12/2006 | Welchko et al. |
| 7,193,392 B2 | 3/2007 | King |
| 7,199,535 B2 | 4/2007 | Welchko et al. |
| 7,282,814 B2 | 10/2007 | Jacobs |
| 7,388,352 B2 | 6/2008 | Bayne et al. |
| 7,579,792 B2 | 8/2009 | Nagashima et al. |
| 7,595,597 B2 | 9/2009 | King et al. |
| 7,800,331 B2 | 9/2010 | Chakrabarti et al. |
| 2003/0209375 A1 | 11/2003 | Suzuki |
| 2005/0035737 A1 | 2/2005 | Elder |
| 2005/0035741 A1 | 2/2005 | Elder |
| 2005/0082095 A1 | 4/2005 | Tamai |
| 2005/0141154 A1 | 6/2005 | Consadori |
| 2005/0174092 A1 | 8/2005 | Dougherty |
| 2005/0285566 A1 | 12/2005 | Furukawa |
| 2006/0098390 A1 | 5/2006 | Ashtiani |
| 2006/0125319 A1 | 6/2006 | King |
| 2006/0201724 A1 | 9/2006 | Leblanc |
| 2007/0184339 A1 | 8/2007 | Scheucher |
| 2007/0188114 A1 | 8/2007 | Lys |
| 2007/0219670 A1 | 9/2007 | Tenaka |
| 2007/0247116 A1 | 10/2007 | Morita |
| 2007/0247117 A1 | 10/2007 | Morita |
| 2007/0272116 A1 | 11/2007 | Bartley |
| 2007/0284159 A1 | 12/2007 | Takami |
| 2008/0018299 A1 | 1/2008 | Renda |
| 2008/0031019 A1 | 2/2008 | Alexander |
| 2008/0042493 A1 | 2/2008 | Jacobs |
| 2009/0033252 A1 | 2/2009 | Smith et al. |

* cited by examiner

Two-Switch Primary to Secondary: Asynchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | CL/OP | OP/OP | OP/OP | CL/OP | CH | DIS | N/A |
| 3 | OP/OP | OP/CL | OP/CL | OP/OP | DIS | N/A | CH |

Fig. 5

Two-Switch Primary to Secondary: Synchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | CL/OP | OP/OP | OP/OP | CL/OP | CH | DIS | N/A |
| 3 | OP/OP | OP/CL | OP/CL | OP/OP | DIS | N/A | CH |
| 4 | OP/OP | CL/CL | CL/CL | OP/OP | DIS | N/A | CH |

Fig. 6

Two-Switch Secondary to Primary: Asynchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | OP/OP | CL/OP | CL/OP | OP/OP | CH | N/A | DIS |
| 3 | OP/CL | OP/OP | OP/OP | OP/CL | DIS | CH | N/A |

Fig. 7

Two-Switch Secondary to Primary: Synchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | OP/OP | CL/OP | CL/OP | OP/OP | CH | N/A | DIS |
| 3 | OP/CL | OP/OP | OP/OP | OP/CL | DIS | CH | N/A |
| 4 | CL/CL | OP/OP | OP/OP | CL/CL | DIS | CH | N/A |

Fig. 8

Single-Switch Boost Primary to Secondary Mode: Asynchronous Mode

| Step | Q1/D1 | Q2/D2 | Q3/D3 | Q4/D4 | L1 | G1 | G2 |
|---|---|---|---|---|---|---|---|
| 1 | CL/OP | OP/OP | OP/OP | OP/OP | N/A | N/A | N/A |
| 2 | CL/OP | OP/OP | OP/OP | CL/OP | CH | DIS | N/A |
| 3 | CL/OP | OP/OP | OP/CL | OP/OP | DIS | N/A | CH |

Fig. 9

Single-Switch Boost Primary to Secondary Mode: Synchronous Mode

| Step | Q1/D1 | Q2/D2 | Q3/D3 | Q4/D4 | L1 | G1 | G2 |
|---|---|---|---|---|---|---|---|
| 1 | CL/OP | OP/OP | OP/OP | OP/OP | N/A | N/A | N/A |
| 2 | CL/OP | OP/OP | OP/OP | CL/OP | CH | DIS | N/A |
| 3 | CL/OP | OP/OP | OP/CL | OP/OP | DIS | N/A | CH |
| 4 | CL/OP | OP/OP | CL/CL | OP/OP | DIS | N/A | CH |

Fig. 10

Single-Switch Buck Primary to Secondary Mode: Asynchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | CL/OP | OP/OP | OP/OP | OP/OP | CH | DIS | N/A |
| 3 | CL/OP | OP/OP | OP/CL | OP/OP | CH | DIS | CH |
| 4 | OP/OP | OP/OP | OP/CL | OP/OP | DIS | N/A | CH |

Fig. 11

Single-Switch Buck Primary to Secondary Mode: Synchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | CL/OP | OP/OP | OP/OP | OP/OP | CH | DIS | N/A |
| 3 | CL/OP | OP/OP | OP/CL | OP/OP | CH | DIS | CH |
| 4 | OP/OP | OP/OP | OP/CL | OP/OP | DIS | N/A | CH |
| 5 | OP/OP | OP/OP | CL/CL | OP/OP | DIS | N/A | CH |

Fig. 12

Single-Switch Boost Secondary to Primary Mode: Asynchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | CL/OP | OP/OP | N/A | N/A | N/A |
| 2 | OP/OP | CL/OP | CL/OP | OP/OP | CH | N/A | DIS |
| 3 | OP/CL | OP/OP | CL/OP | OP/OP | DIS | CH | N/A |

Fig. 13

Single-Switch Boost Secondary to Primary Mode: Synchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | CL/OP | OP/OP | N/A | N/A | N/A |
| 2 | OP/OP | CL/OP | CL/OP | OP/OP | CH | N/A | DIS |
| 3 | OP/CL | OP/OP | CL/OP | OP/OP | DIS | CH | N/A |
| 4 | CL/CL | OP/OP | CL/OP | OP/OP | DIS | CH | N/A |

Fig. 14

Single-Switch Buck Secondary to Primary Mode: Asynchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | OP/OP | OP/OP | CL/OP | OP/OP | CH | N/A | DIS |
| 3 | OP/CL | OP/OP | CL/OP | OP/OP | CH | CH | DIS |
| 4 | OP/CL | OP/OP | OP/OP | OP/OP | DIS | CH | N/A |

Fig. 15

Single-Switch Buck Secondary to Primary Mode: Synchronous Mode

| Step | Q1/D1 | Q2/D2 | Q3/D3 | Q4/D4 | L1 | G1 | G2 |
|---|---|---|---|---|---|---|---|
| 1 | OP/OP | OP/OP | OP/OP | OP/OP | N/A | N/A | N/A |
| 2 | OP/OP | OP/OP | CL/OP | OP/OP | CH | N/A | DIS |
| 3 | OP/CL | OP/OP | CL/OP | OP/OP | CH | CH | DIS |
| 4 | OP/CL | OP/OP | OP/OP | OP/OP | DIS | CH | N/A |
| 5 | CL/CL | OP/OP | OP/OP | OP/OP | DIS | CH | N/A |

Fig. 16

ENERGY MANAGEMENT SYSTEM

BACKGROUND AND SUMMARY

The present invention generally relates to an apparatus and methodology for combining multiple energy storage and/or generation systems, so that a desired combination of cost and effectiveness can be achieved by efficiently switching power into, out of, and/or around the power units to supply power to a load.

There is a growing need for the electrification of the transportation industry, and to supplement the electric power generation and distribution system (the electric utility grid) by storing energy at times when the grid has excess capacity, and releasing energy into the grid at times when generation and/or grid usage approaches maximum capacity. In addition, the cost and efficiency of storing and generating electrical power to run portable appliances has become increasingly important. The system disclosed herein can provide an efficient and convenient methodology to combine multiple electrical power storage and/or generation systems (power units) so that a desired combination of cost and effectiveness can be achieved by efficiently switching power into, out of, and/or around the power units.

In the transportation vehicle industry (including watercraft) where electrical power is used, there are internal combustion engine hybrids, fuel cell hybrids, and battery electric vehicles. In the portable appliance industry, manufacturers of portable media appliances such as mobile computers, telecommunication devices, and other entertainment devices are constantly searching for an optimum mix of cost and performance in their electrical power systems. As new and different power storage and generation methodologies evolve, there may be additional modes of power for these transportation vehicles and portable appliances. The system disclosed herein can assist in finding a desired mix of existing and future energy generation and/or storage units for these industries as well as other industries facing energy generation and/or storage issues.

The utility industry is constantly searching for more efficient ways to store energy in times of excess capacity and to release energy to supplement generation at times of peak demand. In the process, various additional peak time generation units are brought online and energy storage units are discharged. The system disclosed herein can assist in combining a desired mix of energy generation and/or storage units for the utility industry and to provide backup power as well as supplemental power. This system can blend and manage multiple packs of different batteries of the same or different chemistry, with each pack having different characteristics due to state-of-life or structure, or other reason.

Different power storage and power generating units have different cost and performance characteristics. These characteristics include, but are not limited to:

Financial cost: the cost per unit of energy stored or generated;

Energy density: the weight and volume of the module versus the amount of energy stored/delivered;

Energy efficiency: the rate of storage and discharge of energy, and/or the efficiency (minimal energy loss) in storage and discharge of energy;

Cycle Life: the useful life of the module (charge, discharge and/or energy generation life), and the stability of chemistry and/or structure;

Safety: the thermal stability, chemical inertness, energy and/or chemical containment in the event of breach of containment; and Environmental operating range: the temperature, humidity, vibration, corrosive resistance, etc.

The system disclosed herein can be used in developing a combination of power generation and/or storage units that balances these characteristics while meeting desired objectives.

The energy management system can connect a load to multiple energy sources. The energy management system includes a load connection for connecting the load; a first source connection for connecting a first energy source having a first voltage; a second source connection for connecting a second energy source having a second voltage; and a control unit for receiving communications regarding the load, the first energy source and the second energy source. The first voltage of the first energy source can be the same as or different from the second voltage of the second energy source. The energy management system transfers energy from at least one of the first energy source and the second energy source to the load when the control unit receives a power demand from the load, transfers energy from the load to at least one of the first energy source and the second energy source when the control unit receives a charging current from the load; and transfers energy from either of the first and second energy sources to the other of the first and second energy sources when the control unit determines an energy transfer is necessary.

An energy management system for coupling a load to multiple energy sources is disclosed. The energy management system includes a load connection, a first source connection, a second source connection, an inductor, four switches and a control unit. The load connection is used for connecting the load to the energy management system. The first source connection is used for connecting a first energy source having a first voltage to the energy management system. The first source connection has a positive terminal and a negative terminal, and the first source connection is in parallel with the load connection. The second source connection is used for connecting a second energy source having a second voltage to the energy management system. The second source connection has a positive terminal and a negative terminal. The second voltage can be equal to or different from the first voltage. The inductor extends from a first end to a second end. The first switch couples the positive terminal of the first source connection to the first end of the inductor. The second switch couples the negative terminal of the first source connection to the first end of the inductor. The third switch couples the positive terminal of the second source connection to the second end of the inductor. The fourth switch couples the negative terminal of the second source connection to the second end of the inductor. The control unit controls the switching of the first, second, third and fourth switches to transfer energy between the first energy source and the second energy source through the inductor.

The energy management system can also include a first diode in parallel with the first switch, a second diode in parallel with the second switch, a third diode in parallel with the third switch, and a fourth diode in parallel with the fourth switch. The energy management system can also include a first capacitor in parallel with the first source connection, and a second capacitor in parallel with the second source connection.

The energy management system can include a plurality of sensors providing readings monitoring the condition of at least one of the first energy source, the second energy source and the load. The readings can be sent to the control unit, and the control unit can use the readings to control the switching of the first, second, third and fourth switches. The energy management system can also include a sensor interface that receives and processes the sensor readings from the plurality of sensors, and then provides the processed sensor readings to the control unit. The plurality of sensors can include a first source ammeter for monitoring the current flowing through the first source, a second source ammeter for monitoring the current flowing through the second source, a load ammeter for monitoring the current flowing through the load, a first source voltmeter for monitoring the voltage across the first source, and a second source voltmeter for monitoring the voltage across the second source.

A method for controlling an energy management system that couples a system load to a first energy source and a second energy source is disclosed. The system load is connected in parallel with the first energy source, the first energy source has a positive terminal and a negative terminal, the second energy source has a positive terminal and a negative terminal. The energy management system includes an inductor extending from a first end to a second end, a first switch that couples the positive terminal of the first source to the first end of the inductor, a second switch that couples the negative terminal of the first source to the first end of the inductor, a third switch that couples the positive terminal of the second source to the second end of the inductor, and a fourth switch that couples the negative terminal of the second source to the second end of the inductor. The method for controlling the energy management system includes evaluating the states of the system load, the first energy source and the second energy source; determining the direction and proportion of energy flow between the first energy source, the second energy source and the system load; selecting whether to use a two-switch state or a one switch state to move energy between the first energy source and the second energy source; and controlling the switching of the first, second, third and fourth switches to transfer energy between the first energy source and the second energy source through the inductor using the selected one of the two-switch state or the one switch state. The two switch state closes the first and fourth switches, or the second and third switches or none of the switches at any one time. The one switch state closes only one of the switches or none of the switches at any one time.

When the energy management system also includes a first diode in parallel with the first switch, a second diode in parallel with the second switch, a third diode in parallel with the third switch, and a fourth diode in parallel with the fourth switch, the method for controlling the energy management system can also include determining, based on the direction of energy flow, which of the first energy source, the second energy source and the system load is an energy flow source and which is an energy flow destination; selecting whether to use a synchronous mode or an asynchronous mode to move energy from the energy flow source to the energy flow destination; and controlling the switching of the first, second, third and fourth switches to transfer energy from the energy flow source to the energy flow destination through the inductor using the selected one of the synchronous mode or an asynchronous mode. When the two-switch state and synchronous mode are both selected, two switches are closed to move energy from the energy flow source to the inductor and then those two switches are opened and the other two switches are closed to move energy from the inductor to the energy flow destination. When the two-switch state and asynchronous mode are both selected, two switches are closed to move energy from the energy flow source to the inductor and then those two switches are opened and energy moves from the inductor to the energy flow destination through two of the first, second, third and fourth diodes.

When the energy management system also includes a first diode in parallel with the first switch, a second diode in parallel with the second switch, a third diode in parallel with the third switch, and a fourth diode in parallel with the fourth switch, and the method for controlling the energy management system can also include determining a voltage for each of the first and second energy sources; determining, based on the direction of energy flow, which of the first energy source, the second energy source and the system load is an energy flow source and which is an energy flow destination; selecting whether to use a synchronous mode or an asynchronous mode to move energy from the energy flow source to the energy flow destination; and controlling the switching of the four switches to transfer energy from the energy flow source to the energy flow destination through the inductor using the selected one of the synchronous mode or the asynchronous mode. When the one-switch state is selected and the voltage of the energy flow source is less than the voltage of the energy flow destination, the four switches are controlled to use a boost conversion mode to transfer energy between the energy flow source and the energy flow destination through the inductor. When the one-switch state is selected and the voltage of the energy flow source is not less than the voltage of the energy flow destination, the four switches are controlled to use a buck conversion mode to transfer energy between the energy flow source and the energy flow destination through the inductor.

The method for controlling the energy management system can also include monitoring the voltage of the energy flow source and the energy flow destination; and when using the buck conversion mode and the voltage of the energy flow source becomes less than the voltage of the energy flow destination, switching from buck conversion mode to boost conversion mode.

An energy management system for coupling a load to multiple energy sources is disclosed that includes a load connection, a first source connection, a second source connection, a control unit and a plurality of energy management modules. The load connection is used for connecting the load to the energy management system. The first source connection is used for connecting a first energy source having a first voltage to the energy management system, and the second source connection is used for connecting a second energy source having a second voltage to the energy management system. The second voltage can be equal to or different from the first voltage. Each of the first and second source connections has a positive terminal and a negative terminal. The first source connection is in parallel with the load connection. Each of the plurality of energy management modules includes an inductor that extends from a first end to a second end, and four switches. The first switch couples the positive terminal of the first source connection to the first end of the inductor, the second switch couples the negative terminal of the first source connection to the first end of the inductor, the third switch couples the positive terminal of the second source connection to the second end of the inductor, and the fourth switch couples the negative terminal of the second source connection to the second end of the inductor. The control unit controls the switching of the four switches of each of the plurality of energy management modules to transfer energy between the first energy source and the second energy source through the inductor of the respective energy management module.

Each of the plurality of energy management modules can also include a first diode in parallel with the first switch, a second diode in parallel with the second switch, a third diode in parallel with the third switch, and a fourth diode in parallel with the fourth switch. The energy management system can also include a first capacitor in parallel with the first source connection, and a second capacitor in parallel with the second source connection. The energy management system can also include a plurality of sensors providing readings monitoring the condition of at least one of the first energy source, the second energy source and the load, where the readings are sent to the control unit which uses them to control the switching of the four switches of each of the plurality of energy management modules. The energy management system can also include a sensor interface that receives and processes the sensor readings from the plurality of sensors, and provides the processed sensor readings to the control unit. The plurality of sensors can include one or more of a first source ammeter for monitoring the current flowing through the first source, a second source ammeter for monitoring the current flowing through the second source, a load ammeter for monitoring the current flowing through the load, a first source voltmeter for monitoring the voltage across the first source, and a second source voltmeter for monitoring the voltage across the second source.

The energy management system can also include a third source connection for connecting a third energy source to the energy management system, and at least one supplementary energy management module. The third source connection has a positive terminal and a negative terminal. Each of the at least one supplementary energy management modules includes an inductor extending from a first end to a second end and four switches. The first switch couples the positive terminal of the first source connection to the first end of the inductor, the second switch couples the negative terminal of the first source connection to the first end of the inductor, the third switch couples the positive terminal of the third source connection to the second end of the inductor, and the fourth switch couples the negative terminal of the third source connection to the second end of the inductor. The control unit also controls the switching of the four switches of each of the at least one supplementary energy management modules to transfer energy between the first energy source and the third energy source through the inductor of the respective supplementary energy management module. Each of the at least one supplementary energy management modules can include a first diode in parallel with the first switch, a second diode in parallel with the second switch, a third diode in parallel with the third switch, and a fourth diode in parallel with the fourth switch. The energy management system can also include a third capacitor in parallel with the third source connection. The energy management system can include a plurality of sensors providing readings monitoring the condition of at least one of the first, second and third energy sources and the load. The readings can be sent to the control unit which uses the readings to control the switching of the four switches of each of the plurality of energy management modules and of each of the at least one supplementary energy management modules. The plurality of sensors can include a first source ammeter for monitoring the current flowing through the first source, a second source ammeter for monitoring the current flowing through the second source, a third source ammeter for monitoring the current flowing through the third source, a load ammeter for monitoring the current flowing through the load, a first source voltmeter for monitoring the voltage across the first source, a second source voltmeter for monitoring the voltage across the second source, and a third source voltmeter for monitoring the voltage across the third source.

The energy management system can also include a communications bus connecting the control unit to each of the plurality of energy management modules. The control unit can send commands to each of the plurality of energy management modules through the communications bus. The control unit can receive status information from each of the plurality of energy management modules through the communications bus, and the control unit can use the status information to apportion the amount of energy transferred by each of the plurality of energy management modules. The energy management system can include a user input module for receiving user commands, and the control unit can use the user commands to control the switching of the four switches of each of the plurality of energy management modules. The energy management system can include a user output module for displaying status of the energy management system.

The energy management system can include a redundant control unit that monitors the health of the control unit. When the redundant control unit determines that the control unit is not functioning properly, the redundant control unit can control the switching of the switches of each of the plurality of energy management modules to transfer energy between the first energy source and the second energy source through the inductor of the respective energy management module. At least one of the plurality of energy management modules can be a protected energy management module that also includes protection logic to protect itself from damage. The protected energy management module takes into account the status of the protection logic when responding to commands from the control unit.

A method for controlling an energy management system that couples a system load to a first energy source and a second energy source is disclosed that uses a plurality of energy management modules. The system load is connected in parallel with the first energy source, and the first and second energy sources have a positive terminal and a negative terminal. Each of the plurality of energy management modules includes an inductor extending from a first end to a second end and four switches. The first switch couples the positive terminal of the first source connection to the first end of the inductor, the second switch couples the negative terminal of the first source connection to the first end of the inductor, the third switch couples the positive terminal of the second source connection to the second end of the inductor, and the fourth switch couples the negative terminal of the second source connection to the second end of the inductor. The method for controlling the energy management system includes evaluating the conditions of the system load, the first energy source and the second energy source; determining whether to control the energy management system using manual mode or automatic mode; and controlling the switching of the four switches of each of the plurality of energy management modules to transfer energy between the first energy source and the second energy source through the respective inductor.

The method for controlling the energy management system in manual mode can include receiving user input parameters defining the direction and proportion of energy flow between the first energy source, the second energy source and the system load; and controlling the switching of the four switches of each of the plurality of energy management modules to transfer energy in accordance with the user input parameters. The method for controlling the energy management system in manual mode can also include determining, based on the direction of energy flow, which of the first energy source, the second energy source and the system load is an energy flow source and which is an energy flow destination; apportioning the energy flow between each of the plurality of energy management modules in accordance with the user input parameters; for each of the plurality of energy management modules, selecting whether to use a two-switch state or a one switch state to move the apportioned amount of energy from the energy flow source to the energy flow destination; for each of the plurality of energy management modules, selecting whether to use a synchronous mode or an asynchronous mode to move the apportioned amount of energy from the energy flow source to the energy flow destination; and controlling the switching of the four switches of each of the plurality of energy management modules to transfer energy from the energy flow source to the energy flow destination through the respective inductor using the selected one of the two-switch state or the one switch state, and of the synchronous mode or the asynchronous mode.

The method for controlling the energy management system in automatic mode can include determining the direction and proportion of energy flow between the first energy source and the second energy source and the system load; determining, based on the direction of energy flow, which of the first energy source, the second energy source and the system load is an energy flow source and which is an energy flow destination; apportioning the energy flow between each of the plurality of energy management modules; for each of the plurality of energy management modules, selecting whether to use a two-switch state or a one switch state to move the apportioned amount of energy from the energy flow source to the energy flow destination; for each of the plurality of energy management modules, selecting whether to use a synchronous mode or an asynchronous mode to move the apportioned amount of energy from the energy flow source to the energy flow destination; and controlling the switching of the four switches of each of the plurality of energy management modules to transfer energy from the energy flow source to the energy flow destination through the respective inductor using the selected one of the two-switch state or the one switch state, and of the synchronous mode or the asynchronous mode. The two switch state closes either the first and fourth switches, the second and third switches or none of the switches at any one time; and the one switch state closes only one of the switches or none of the switches at any one time.

Determining the direction and proportion of energy flow between the first energy source and the second energy source and the system load can include determining whether the system load is using energy from the first and second energy sources; determining whether the system load is supplying energy to the first and second energy sources; and, when the system load is neither using nor supplying energy, determining whether to perform energy balancing between the first and second energy sources. When it is determined that the system load is using energy from the first and second energy sources, the method for controlling the energy management system can include determining whether the amount of current to be supplied to the system load is greater than a threshold current, determining whether at least one of a voltage of the first energy source is less than a threshold voltage and a state-of-charge of the first energy source is less than a threshold state-of-charge, and apportioning the energy flow from the first and second energy sources to the system load accordingly; and when none of the thresholds are exceeded, comparing a timer to a timeout value. When it is determined that the system load is supplying energy to the first and second energy sources, the method for controlling the energy management system can include determining whether the amount of current to be supplied by the system load is greater than a threshold current, determining whether at least one of a voltage of the first energy source is greater than a threshold voltage and a state-of-charge of the first energy source is greater than a threshold state-of-charge, and apportioning the energy flow from the system load to the first and second energy sources accordingly; and when none of the thresholds are exceeded, comparing a timer to a timeout value. When it is determined to perform energy balancing between the first and second energy sources, the method for controlling the energy management system can include determining a state-of-charge of the first and second energy sources, comparing the state-of-charge of the first energy source to maximum and minimum state-of-charge values; comparing the state-of-charge of the second energy source to maximum and minimum state-of-charge values; and apportioning the energy flow between the first energy source and the second energy sources based on the comparisons with the maximum and minimum state-of-charge values.

The method for controlling the energy management system can include selecting N of the plurality of energy management modules to transfer energy between the first energy source and the second energy source, and synchronizing the switching of each of the N selected energy management modules to be out of phase and interlaced with each other. If the time period for the switching of all of the energy management modules is T_sw, then controlling each energy management module to transfer energy for a period of T_sw/N, and offsetting the start time of each successive energy management module by T_sw/N. In this manner, the first energy management module starts conducting energy at time 0, then the first energy management module stops conducting and the second energy management module starts conducting at time T_sw/N, and so on until the (N−1)th energy management module stops conducting and the Nth energy management module starts conducting at time (N−1)*T_sw/N, and the Nth energy management module stops conducting at time T_sw/N, which may be time 0 for the next cycle.

The method for controlling the energy management system can include detecting each of the plurality of energy management modules controlled by the energy management system. The method for controlling the energy management system can include receiving sensor readings indicating the condition of the system load, the first energy source and the second energy source; using the sensor readings to evaluate the condition of the system load, the first energy source and the second energy source; and monitoring the sensor readings while controlling the switching of the first, second, third and fourth switches of each of the plurality of energy management modules.

For a more complete understanding of the present disclosure, reference is now made to the following detailed description and the accompanying drawings.

BRIEF DESCRIPTION OF THE DRAWINGS

FIG. 5 provides the switching sequence for a two-switch state movement of energy from the primary source G1 to the secondary source G2 in asynchronous mode;

FIG. 6 provides the switching sequence for a two-switch state movement of energy from the primary source G1 to the secondary source G2 in synchronous mode;

FIG. 7 provides the switching sequence for a two-switch state movement of energy from the secondary source G2 to the primary source G1 in asynchronous mode;

FIG. 8 provides the switching sequence for a two-switch state movement of energy from the secondary source G2 to the primary source G1 in synchronous mode;

FIG. 9 provides the switching sequence for single-switch boost conversion movement of energy from the primary source G1 to the secondary source G2 in asynchronous mode;

FIG. 10 provides the switching sequence for single-switch boost conversion movement of energy from the primary source G1 to the secondary source G2 in synchronous mode;

FIG. 11 provides the switching sequence for single-switch buck conversion movement of energy from the primary source G1 to the secondary source G2 in asynchronous mode;

FIG. 12 provides the switching sequence for single-switch buck conversion movement of energy from the primary source G1 to the secondary source G2 in synchronous mode;

FIG. 13 provides the switching sequence for single-switch boost conversion movement of energy from the secondary source G2 to the primary source G1 in asynchronous mode;

FIG. 14 provides the switching sequence for single-switch boost conversion movement of energy from the secondary source G2 to the primary source G1 in synchronous mode;

FIG. 15 provides the switching sequence for single-switch buck conversion movement of energy from the secondary source G2 to the primary source G1 in asynchronous mode;

FIG. 16 provides the switching sequence for single-switch buck conversion movement of energy from the secondary source G2 to the primary source G1 in synchronous mode;

DESCRIPTION OF PREFERRED EMBODIMENTS

Figure 1:
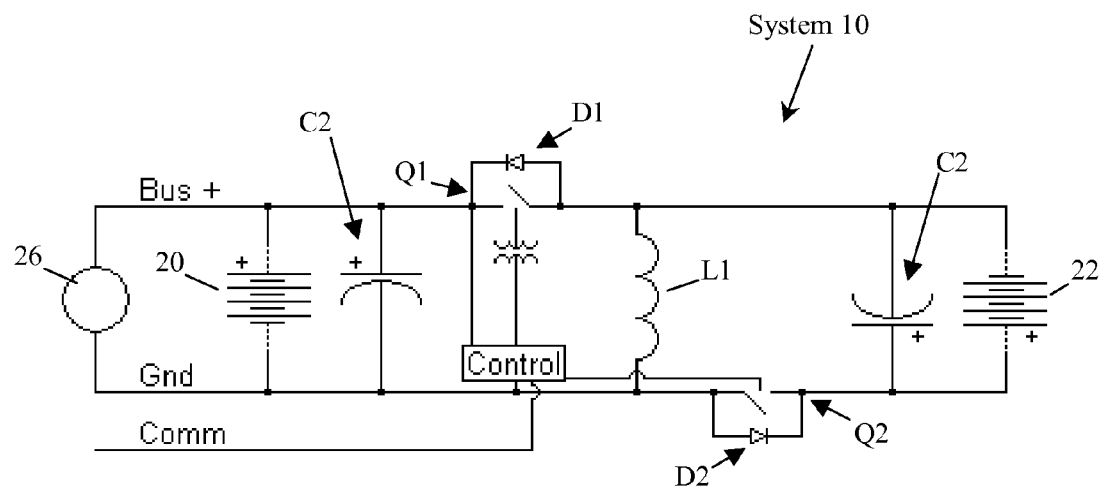
FIG. 1 is a schematic of an exemplary embodiment of a two switch energy management system topology with two power sources.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

This energy management system connects two or more, devices together for the purpose of managing energy flows. At least one of these devices is an energy source, and at least one of these devices is an energy sink. An energy source is any device that generates or releases stored energy through some process. This energy may be electrical, mechanical, or thermal. Some examples of energy sources include solar (photovoltaic) cells, electrical generators (wind, hydroelectric, or otherwise), and piezoelectric devices. An energy sink is any device that consumes energy to perform some process. Some examples of energy sinks include lighting, electrical motors, or heating devices. Energy storage devices, such as but not limited to batteries or pressure vessels, can be both an energy source and an energy sink.

The specific embodiments discussed herein pertain to the blending of electrical energy systems. Since mechanical energy can easily be converted to and from electrical energy, mechanical energy systems can be blended with an initial conversion to electrical energy. In addition, some mechanical systems can be managed by modulating valves or levers which can be actuated or modulated under this topology by replacing electrical switches with mechanical or other types of switches.

An example of the value of utilizing an energy management system would be in the design of a two power unit system for a battery electric vehicle. Depending upon the consumer's daily commute, a highway capable battery electric vehicle might require the ability to travel X miles per day on a single charge, but have the need to occasionally travel X+Y miles. The vehicle could incorporate a higher cost primary battery pack capable of daily recharging for the life of the vehicle and capable of traveling more than X miles on a single charge. The vehicle could also incorporate a lower cost secondary battery pack with a lower cycle life to be used to occasionally travel Y additional miles. A vehicle with two battery chemistries could switch charging and discharging in and out of each battery chemistry unit in a way that better balances performance and cost savings versus a single battery pack using the more expensive batteries. In addition to or in place of cost and cycle life, alternative criteria for the selection of power units could be operating temperature, weight, volume, safety, or other factors.

A battery electric vehicle could utilize Li-ion Titanate batteries as the primary source and lead-acid batteries as a secondary source. The primary source can be comprised of multiple cells and/or modules of batteries to increase range. The secondary source can also be comprised of multiple cells and/or modules so that it is capable of providing power for an extended range. The voltages of the primary and secondary power sources can be different, which is not possible in a parallel circuit. In an electric vehicle, power sources could include any combination of fuel cells, capacitors, batteries, or other sources of electrical energy.

Another power system configuration could be a design for a highway vehicle, watercraft, or home electrical power system using a combination of a photovoltaic as the primary power unit and a battery pack as a secondary power unit. Yet another combination could be a vehicle with a fuel cell as a primary power unit and a capacitor as a secondary power unit. Various combinations of different power storage and power generating units can be used as primary and secondary units in the system.

A portable electronic device, including but not limited to a sound system, could come equipped with a rechargeable Li-ion polymer battery pack (or similar power source) suitable for a couple of hours of playing time, and also include a connection allowing the consumer to add (or otherwise connect) a secondary power source, such as disposable batteries, for extended play.

A backup power supply could utilize batteries as a primary power source and photovoltaic cells as a secondary power source. Alternatively, the backup power supply could utilize two battery chemistries, or combinations of fuel cells, capacitors, batteries, or other sources of electrical energy.

An energy management system could also be used for a home or business to blend one or more energy sources to provide and/or accept power from one or more electrical powered devices. The energy source(s) could be any device that generates or releases stored energy, for example, solar (photovoltaic) cells, electrical generators (wind, hydroelectric, or other), or piezoelectric devices. The electrical powered device(s) could be any device that consumes energy to perform some process, for example, lighting systems, electrical motors, or heating devices. Energy storage devices, for example batteries, could be used by the energy management system as both an energy source to provide additional energy when other sources are generating insufficient energy or as an energy sink when other sources are generating excess energy. One or more of the energy source(s) and electrical powered device(s) could have different or equal voltages.

The present invention allows effective and efficient flow of energy from different energy sources that may or may not have different voltages, which will allow multiple combinations of dissimilar energy sources to be combined to power a load. Examples of loads can be an electrical device such as an appliance, electric vehicle or the transfer of power to the electrical power grid. The ability to utilize dissimilar energy sources with differing voltages will allow device designers to incorporate an optimum mix of energy generation and/or energy storage for said device.

The present invention also allows for the transfer of energy from a source on the main bus to the system's power units. A transfer from a source to power units on the bus would likely be in the form of charging an energy storage device such as a battery or capacitor. The load and source can be the same unit, for example a motor with regeneration capabilities.

Various electrical energy generation and storage units possess different energy performance and cost profiles. With multiple cost and performance profiles, a trade-off between multiple combinations of power units could be made for a specific task. In addition, as new and improved energy storage and generation systems are developed, new combinations can be incorporated to perform the required task.

FIG. 1 is a schematic illustrating an embodiment of the present invention which comprises an energy transfer circuit 10 using a dual battery chemistry. The circuit includes a first switch Q1, a second switch Q2, a first capacitor C1, a second capacitor C2, an inductor L1, a control unit 12, and an isolation switch 14. In the preferred embodiment, the switches Q1 and Q2 are unidirectional protected switches; that include an insulated-gate bipolar transistor (IGBT) with a diode, D1 and D2, respectively. The use of diodes to add protection to the circuitry provides an added margin of safety, but is not required. When the switches Q1 and Q2 are unprotected, the system relies solely on proper control of the switches to maintain proper directional current flow. This embodiment enables power to be drawn from the two power units 20, 22 and recharging to be applied to the same two power units 20, 22.

A primary source 20 can be connected in parallel with the capacitor C1, and a secondary source 22 can be connected in parallel with the capacitor C2. The primary and secondary sources 20, 22 are shown to have dotted connections to represent the ability to remove either source and replace it with a new and/or different storage or power generation technology. In an alternative embodiment, a switch could be added between source 20 and the Bus to remove the primary unit from the circuit. Removal from the circuit may be desired due to a unit malfunction or for any other reason such as the desire to isolate the unit from bus current fluctuations. The capacitors C1 and C2 are included to handle the inrush or required sourced surge of current during the switching events of either Q1 or Q2 (depending on the flow of energy). A load and/or source 26 can be connected in parallel with the primary source 20. In this embodiment, an electric motor is capable of operating both as a load in propulsion mode and as a source in regeneration mode. In an alternative embodiment, a charger could be added in parallel to the load.

The control unit 12 includes a communication input that can be used to monitor power requests and demands, monitor the status of the power sources and manage recharging of the power sources. Inputs can include, but are not limited to, voltage, current, and temperature. This information can be used to determine source and load availability, calculate State of Charge (SOC) of an energy storage device, power potential of an energy device such as a fuel cell or solar panel, and to determine which operating range and/or mode of operation is to be executed. The control unit 12 controls the opening and closing of the switches Q1 and Q2 depending on the external demands from the load and/or source 26 and the status of the system 10 and the power sources 20, 22. FIG. 8 provides a table of potential switch positions appropriate for various uses of the embodiment shown in FIG. 1.

Under normal conditions, the primary source 20 powers the load 26. In this mode of operation, both switches Q1 and Q2 are open. However, when desired, the secondary source 22 can be utilized to power the load 26 or recharge the primary power source 20 by closing switch Q2 and allowing the current to rise within the inductor L1. Once the current reaches either the desired peak or saturation of the inductor L1, the switch Q2 is opened and the switch Q1 is closed allowing the current to flow into the main bus and either power the load 26 or charge the primary source 20, whichever is desired. Since the primary source 20 is not connected in parallel with the secondary source 22, the voltage of the primary source 20 does not have to be equal to the voltage of the secondary source 22. The control unit 12 can control the flow of energy as desired by the user; this is facilitated by the circuit design and the implementation of software which controls the switches Q1 and Q2 to open and close as desired.

To charge the secondary source 22 the opposite sequence of events is utilized to move energy from the main Bus. First switch Q1 is closed allowing the current flow to rise within the inductor L1. Once the current reaches either the desired peak or saturation of the inductor L1, the switch Q1 is opened and the switch Q2 is closed, allowing the current to flow from the inductor L1 into the secondary source 22 to charge the secondary source 22.

Figure 2:
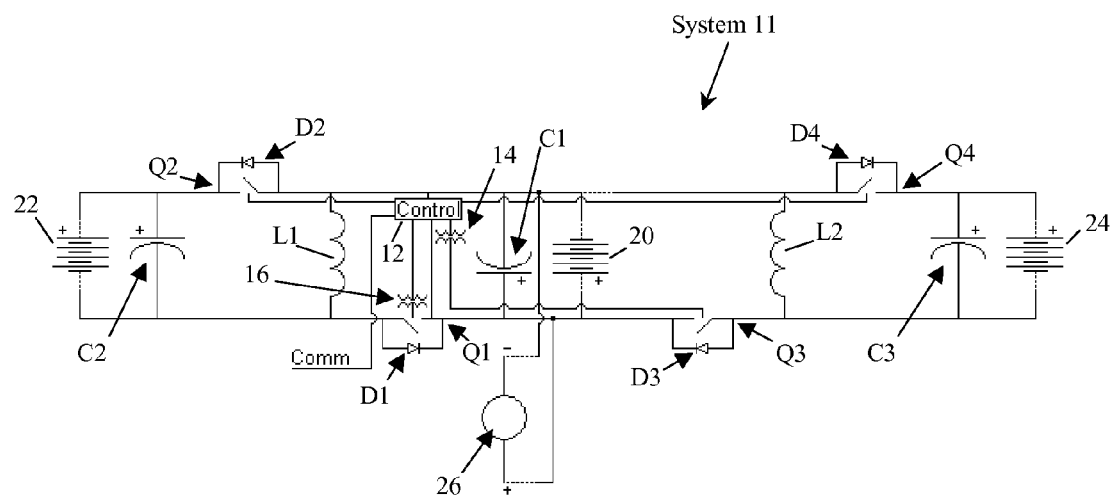
FIG. 2 is a schematic of an exemplary embodiment of a three switch energy management system topology with three power sources.

FIG. 2 is a schematic illustrating an alternative embodiment of the present invention using three power sources: a primary source 20, a secondary source 22, and a tertiary source 24, connected to a source/load 26. The same element references are used in FIG. 2 for elements corresponding to elements in FIG. 1. The embodiment of FIG. 2 comprises three capacitors C1, C2, and C3; four switches Q1, Q2, Q3 and Q4; and two inductors L1 and L2. Each of the three capacitors C1, C2, and C3 are arranged in parallel with the three power sources 20, 22 and 24, respectively. A control unit 12 controls the opening and closing of the four switches Q1, Q2, Q3 and Q4. This embodiment enables power to be drawn from the three power units 20, 22, 24 and recharging to be applied to the same three power units 20, 22, 24.

Figure 3:
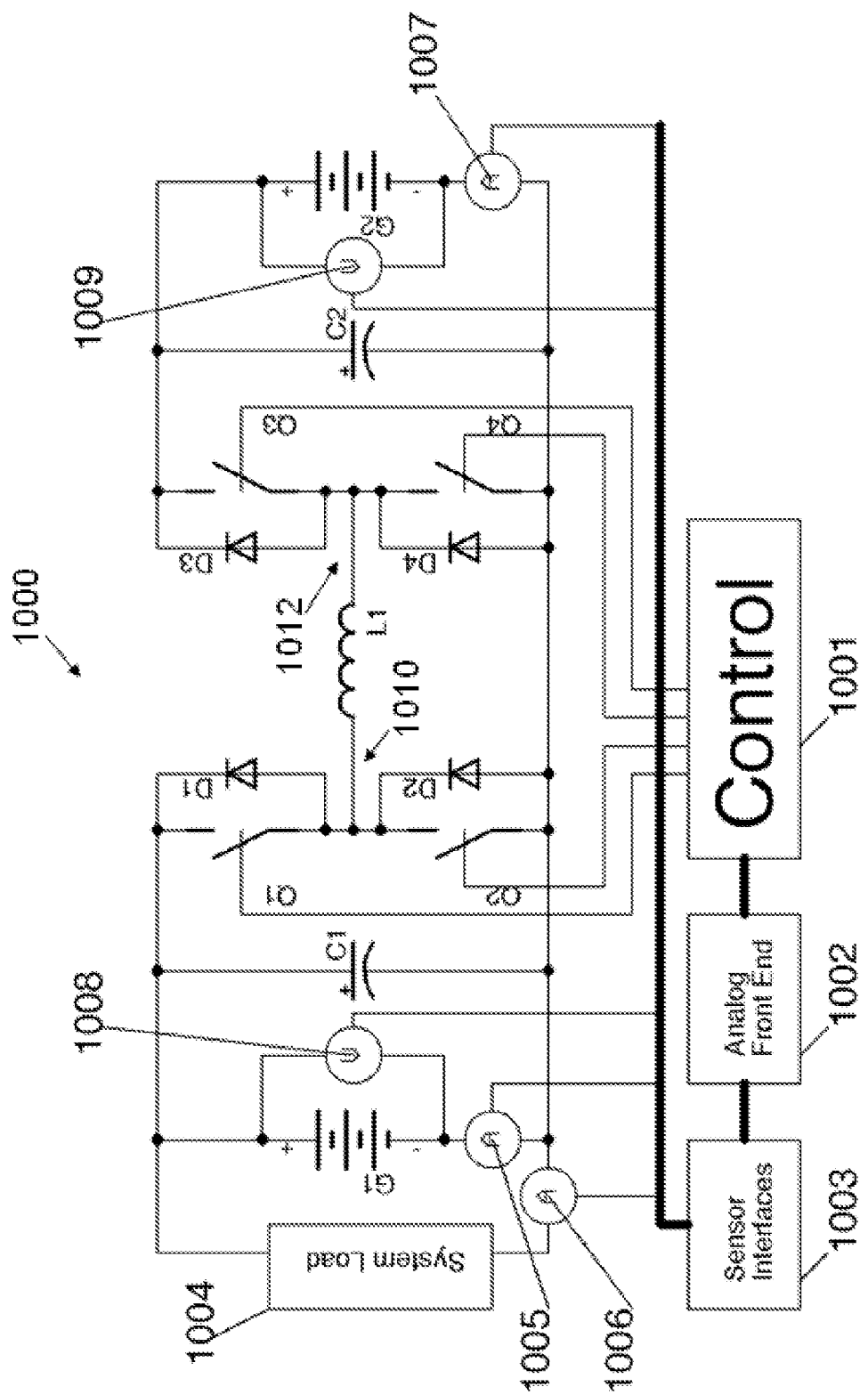
FIG. 3 is a schematic of an exemplary embodiment of a four switch energy management system topology.

FIG. 3 illustrates an exemplary embodiment of a four switch energy management system topology 1000. The four-switch topology can provide expanded functionality and advantages over the two-switch topology. The four-switch topology minimizes voltage spikes that occur when a large amount of power flows through the two-switch topology. Voltage spikes occur across switches at turn-on and turn-off events. These spikes are a function of the rate of change of current (dI/dt) and the rate of change of voltage (dV/dt) with regards to the switch. These spikes create overvoltage conditions that can be detrimental to the switches. The four-switch topology minimizes these spikes by effectively clamping the nodes of the inductor to the voltage busses created by the batteries. The four-switch topology may still have a transient spike while the diodes begin conducting, but not to the level of the dI/dt and dV/dt spikes seen in the two-switch topology. In the four-switch topology, the energy sources and sinks can all be referenced to a common ground point. This alleviates a potential safety hazard with having multiple reference points for the negative terminals of the energy sources and sinks.

The exemplary embodiment of the four switch energy management system 1000 includes a system load 1004; a primary energy source G1; a secondary energy source G2; switches Q1, Q2, Q3, and Q4; diodes D1, D2, D3, and D4; inductor L1; and capacitors C1 and C2. Each of the diodes Dx is placed in parallel with the corresponding switch Qx. The inductor L1 includes a first end 1010 and a second end 1012. The energy sources G1 and G2 can be batteries or any of various different types of energy sources. Each of the energy sources G1 and G2 includes a positive terminal and a negative terminal.

The switch Q1 couples the positive terminal of the primary source G1 to the first end 1010 of the inductor L1. The switch Q2 couples the negative terminal of the primary source G1 to the second end 1012 of the inductor L1. The switch Q3 couples the positive terminal of the secondary source G2 to the second end 1012 of the inductor L1. The switch Q4 couples the negative terminal of the secondary source G2 to the second end 1012 of the inductor L1. Note that switches Q1 and Q2 are coupled to the first end 1010 of the inductor L1, and switches Q3 and Q4 are coupled to the second end 1012 of the inductor L1. The capacitor C1 is placed in parallel with the primary source G1, and the capacitor C2 is placed in parallel with the secondary source G2. The system load 1004 is placed in parallel with the primary source G1.

This exemplary embodiment also includes a control module 1001, an analog front end 1002, a sensor interface 1003, ammeters 1005, 1006, and 1007; and voltmeters 1008 and 1009. The ammeter 1005 is placed in series with the primary source G1 to measure the current flowing through the primary source G1. The ammeter 1006 is placed in series with the system load 1004 to measure the current flowing through the system load 1004. The ammeter 1007 is placed in series with the secondary source G2 to measure the current flowing through the secondary source G2. The voltmeter 1008 is placed across the primary source G1 to measure the voltage of the primary source G1. The voltmeter 1009 is placed across the secondary source G2 to measure the voltage of the secondary source G2.

The analog sensor signals from the ammeters 1005, 1006, and 1007; and the voltmeters 1008 and 1009 are routed to the sensor interface 1003 that can perform any signal conditioning needed by the individual sensors. The output signals from the sensor interface 1003 are routed to the analog front end 1002 that can perform analog signal filtering. The output signals from the analog front end 1002 are routed to the control module 1001 that can use these sensor signals to determine when and for how long to switch each of the switches Q1, Q2, Q3, and Q4.

Modulation Modes

The exemplary four-switch system 1000 can include thirteen different modes of operation. The four-switch system 1000 can operate among three basic operation states: off state, two-switch state, and single-switch state. In the off state, all four switches remain open, and no energy flows between the energy sources. In the two-switch state, two of the switches are modulated to move energy. In the single-switch state, one of the switches is modulated to move energy.

The default state of the system is the off state. In both the two-switch and the single-switch states, there are several modes of operation depending on the desired energy movement. The determinants of the mode of operation are the direction of energy flow (primary G1 to secondary G2, or secondary G2 to primary G1), and the voltage of the energy sources G1 and G2. If the voltage of the source is lower than the voltage of the destination, then a boost-conversion method is utilized. If the voltage of the source is higher than the voltage of the destination, then a buck-conversion method is utilized.

Figure 4:
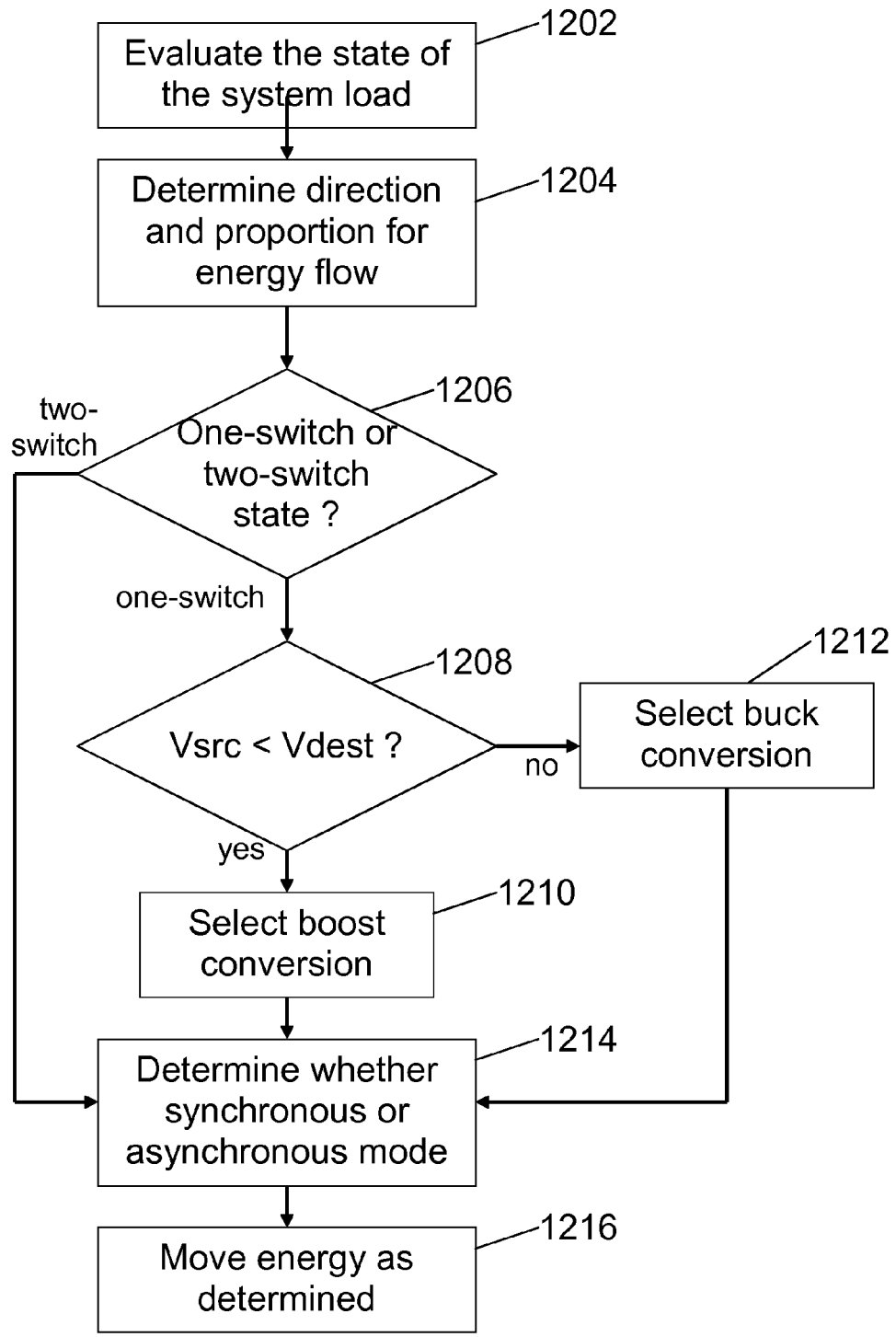
FIG. 4 is an exemplary decision tree that can be used to determine the state of the energy management system.

In operation, the control module 1001 evaluates the state of the system 1000. An exemplary decision tree 1200 that can be used to determine the state of the system is shown in FIG. 4. At block 1202, the control module 1001 evaluates the current state of the system load 1004. The state of the system load 1004 can include: idle, drawing power, or sourcing power. The state of the system load 1004 can be used to determine which direction to move energy. At block 1204, the control module 1001 determines which direction energy needs to flow (primary G1 to secondary G2, secondary G2 to primary G1, or none), and the proportion of energy flow in the desired direction. At block 1206, the control module 1001 determines whether to use the single-switch state or the two-switch state. If two-switch state is selected, then control is passed to block 1214. If single-switch state is to be selected, then control is passed to block 1210.

If single-switch state is selected then an additional decision based on the voltages of the primary source G1 and the secondary source G2 and the direction of energy movement is needed. At block 1208, it is determined whether the voltage of the source for the energy movement (Vsrc) is lower than the voltage of the destination for the energy movement (Vdest). If Vsrc is lower than Vdest, then, at block 1210, a boost-conversion method is selected. Otherwise, at block 1212, a buck-conversion method is selected. From either of blocks 1210 and 1212, control is passed to block 1214.

At block 1214, the control module 1001 determines whether synchronous or asynchronous mode should be used. Then at block 1216, energy is moved using the determined state and mode. The specific methods of modulation for each of the modes are described below.

For each modulation method described below, the modulation can either be in asynchronous mode or synchronous mode. In asynchronous mode, energy is moved from the discharging inductor to the energy destination through only a forward conducting diode (the corresponding switch is open). In synchronous mode, energy is moved from the discharging inductor to the energy destination through both a forward conducting diode and the corresponding switch (the corresponding switch is closed).

In the two-switch modulation method, two switches are modulated to create energy movement through the system 1000. The two switches that are modulated are the diagonal pairs (i.e. Q1 and Q4, or Q2 and Q3). When moving energy into the secondary, the pair of switches Q1 and Q4 are modulated.

FIG. 5 provides the switching sequence for a two-switch state movement of energy from the primary source G1 to the secondary source G2 in asynchronous mode. At step 1, all of the switches are open. At step 2, switches Q1 and Q4 are closed to discharge energy from the primary source G1 into the inductor L1. At step 3, switches Q1 and Q4 are opened, and the forward diodes D2 and D3 begin conducting to discharge energy from the inductor L1 into the secondary source G2. These steps are repeated so long as energy movement from the primary source G1 to the secondary source G2 in asynchronous mode is desired.

FIG. 6 provides the switching sequence for a two-switch state movement of energy from the primary source G1 to the secondary source G2 in synchronous mode. In synchronous mode, the opposite pair of diagonal switches are closed to provide a lower resistance path for the discharge of the energy from the inductor L1 into the energy sink G2. At step 1, all of the switches are open. At step 2, switches Q1 and Q4 are closed to discharge energy from the primary source G1 into the inductor L1. At step 3, switches Q1 and Q4 are opened, and the forward diodes D2 and D3 begin conducting to discharge energy from the inductor L1 into the secondary source G2. At step 4, switches Q2 and Q3 are closed to provide a lower resistance path for the discharge of the energy from the inductor L1 into the secondary source G2. These steps are repeated so long as energy movement from the primary source G1 to the secondary source G2 in synchronous mode is desired.

When operating with two-switch modulation, to effectively move energy there is a minimum on-time relative to the rate of repetition of the switching sequence. The minimum on-time can be characterized by VG2/(VG1+VG2)*TS, where VG1 is the voltage across the primary source G1, VG2 is the voltage across the secondary source G2, and TS is the time it takes to complete one repetition of the switching sequence. Until this minimum on-time is reached, no appreciable energy is moved. Some leakage energy will flow, but most of the energy will be lost in the inductor L1 through parasitic losses.

FIG. 7 provides the switching sequence for a two-switch state movement of energy from the secondary source G2 to the primary source G1 in asynchronous mode. At step 1, all of the switches are open. At step 2, switches Q2 and Q3 are closed to discharge energy from the secondary source G2 into the inductor L1. At step 3, switches Q2 and Q3 are opened, and the forward diodes D1 and D4 begin conducting to discharge energy from the inductor L1 into the primary source G1. These steps are repeated so long as energy movement from the secondary source G2 to the primary source G1 in asynchronous mode is desired.

FIG. 8 provides the switching sequence for a two-switch state movement of energy from the secondary source G2 to the primary source G1 in synchronous mode. In synchronous mode, the opposite pair of diagonal switches are closed to provide a lower resistance path for the discharge of the energy from the inductor L1 into the energy sink G1. At step 1, all of the switches are open. At step 2, switches Q2 and Q3 are closed to discharge energy from the secondary source G2 into the inductor L1. At step 3, switches Q2 and Q3 are opened, and the forward diodes D1 and D4 begin conducting to discharge energy from the inductor L1 into the primary source G1. At step 4, switches Q1 and Q4 are closed to provide a lower resistance path for the discharge of the energy from the inductor L1 into the primary source G1. These steps are repeated so long as energy movement from the secondary source G2 to the primary source G1 in synchronous mode is desired.

To control the amount of energy that is moved through the system, the time spent in step 2 ("on-time") can be adjusted. A longer on-time moves more energy from the energy source into the inductor L1, whereas a shorter on-time moves less energy from the energy source into the inductor L1.

When examining single-switch modulation modes, there are four combinations: energy can either be buck converted or boost converted, and energy can either be moved from the primary source G1 to the secondary source G2, or from the secondary source G2 to the primary source G1. Each of these modes is described below. As with two-switch modulation mode, each basic mode can further be executed in asynchronous or synchronous mode. In asynchronous mode, energy is moved from the discharging inductor to the energy destination through forward conducting diodes (the corresponding switches are open). In synchronous mode, energy is moved from the discharging inductor to the energy destination through both forward conducting diodes and the corresponding switches (the corresponding switches are closed).

FIGS. 9 and 10 provide the switching sequence for single-switch boost conversion movement of energy from the primary source G1 to the secondary source G2 in asynchronous and synchronous mode, respectively. Boost-conversion mode is utilized when the voltage of the source is less than the voltage of the destination, which in this case means the voltage of the primary source G1 is less than the voltage of the secondary source G2. When operating in boost conversion mode moving energy from the primary source G1 to the secondary source G2, the switch Q1 is kept closed and the switch Q4 is modulated.

In FIG. 9, asynchronous single-switch boost conversion movement of energy from the primary source G1 to the secondary source G2, at step 1, switch Q1 is closed and the other switches and diodes are open. In FIGS. 9-16 and the discussion thereof, for each of the diodes, "closed" (CL) indicates that the diode is forward conducting and "open" (OP) indicates that the diode is not forward conducting. At step 2, the diagonal switch Q4 is closed to discharge the lower voltage primary source G1 into the inductor L1. At step 3, the switch Q4 is opened and the diode D3 begins forward conducting to discharge the inductor L1 into the higher voltage secondary source G2. These steps are repeated so long as single-switch boost conversion movement of energy from the primary source G1 to the secondary source G2 in asynchronous mode is desired.

In FIG. 10, synchronous mode single-switch boost conversion movement of energy from the primary source G1 to the secondary source G2, at step 1, switch Q1 is closed and the other switches and diodes are open. At step 2, the diagonal switch Q4 is closed to discharge the lower voltage primary source G1 into the inductor L1. At step 3, the switch Q4 is opened and the diode D3 begins forward conducting to discharge the inductor L1 into the higher voltage secondary source G2. At step 4, the switch Q3 is closed to provide an additional lower resistance path for the discharge of energy from the inductor L1 into the higher voltage secondary source G2. These steps are repeated so long as single-switch boost conversion movement of energy from the primary source G1 to the secondary source G2 in synchronous mode is desired.

FIGS. 11 and 12 provide the switching sequence for single-switch buck conversion movement of energy from the primary source G1 to the secondary source G2 in asynchronous and synchronous mode, respectively. Buck-conversion mode is utilized when the voltage of the destination is less than the voltage of the source, which in this case means the voltage of the primary source G1 is greater than the voltage of the secondary source G2. When operating in buck conversion mode moving energy from the primary source G1 to the secondary source G2, the switch Q1 is modulated.

In FIG. 11, the asynchronous single-switch buck conversion movement of energy from the primary source G1 to the secondary source G2, at step 1, all of the switches are open. At step 2, the switch Q1 is closed discharging the higher voltage primary source G1 into the inductor L1. At step 3, the voltage across the inductor has decreased to the point that the diode D3 begins to forward conduct current directly from G1 to G2. Note that depending on the rate of switching and time spent in step 2, step 3 may be skipped entirely. At step 4, the switch Q1 is opened and the diode D3 begins forward conducting to discharge the inductor L1 into the lower voltage secondary source G2. These steps are repeated so long as single-switch buck conversion movement of energy from the primary source G1 to the secondary source G2 in asynchronous mode is desired.

In FIG. 12, synchronous mode single-switch buck conversion movement of energy from the primary source G1 to the secondary source G2, at step 1, all of the switches are open. At step 2, the switch Q1 is closed to discharge the higher voltage primary source G1 into the inductor L1. At step 3, the voltage across the inductor has decreased to the point that the diode D3 begins to forward conduct current directly from G1 to G2. Note that depending on the rate of switching and time spent in step 2, step 3 may be skipped entirely. At step 4, the switch Q1 is opened and the diode D3 begins forward conducting to discharge the inductor L1 into the lower voltage secondary source G2. At step 5, the switch Q3 is closed to provide an additional lower resistance path for the discharge of energy from the inductor L1 into the lower voltage secondary source G2. These steps are repeated so long as single-switch buck conversion movement of energy from the primary source G1 to the secondary source G2 in synchronous mode is desired.

FIGS. 13 and 14 provide the switching sequence for single-switch boost conversion movement of energy from the secondary source G2 to the primary source G1 in asynchronous and synchronous mode, respectively. Boost-conversion mode is utilized when the voltage of the source is less than the voltage of the destination, which in this case means the voltage of the secondary source G2 is less than the voltage of the primary source G1. When operating in boost conversion mode moving energy from the secondary source G2 to the primary source G1, the switch Q3 is kept closed and the switch Q2 is modulated.

In FIG. 13, asynchronous single-switch boost conversion movement of energy from the secondary source G2 to the primary source G1, at step 1, switch Q3 is closed and the other switches and diodes are open. At step 2, the diagonal switch Q2 is closed to discharge the lower voltage secondary source G2 into the inductor L1. At step 3, the switch Q2 is opened and the diode D1 begins forward conducting to discharge the inductor L1 into the higher voltage primary source G1. These steps are repeated so long as single-switch boost conversion movement of energy from the secondary source G2 to the primary source G1 in asynchronous mode is desired.

In FIG. 14, synchronous mode single-switch boost conversion movement of energy from the secondary source G2 to the primary source G1, at step 1, switch Q3 is closed and the other switches and diodes are open. At step 2, the diagonal switch Q2 is closed to discharge the lower voltage secondary source G2 into the inductor L1. At step 3, the switch Q2 is opened and the diode D1 begins forward conducting to discharge the inductor L1 into the higher voltage primary source G1. At step 4, the switch Q1 is closed to provide an additional lower resistance path for the discharge of energy from the inductor L1 into the higher voltage primary source G1. These steps are repeated so long as single-switch boost conversion movement of energy from the secondary source G2 to the primary source G1 in synchronous mode is desired.

FIGS. 15 and 16 provide the switching sequence for single-switch buck conversion movement of energy from the secondary source G2 to the primary source G1 in asynchronous and synchronous mode, respectively. Buck-conversion mode is utilized when the voltage of the destination is less than the voltage of the source, which in this case means the voltage of the secondary source G2 is greater than the voltage of the primary source G1. When operating in buck conversion mode moving energy from the secondary source G2 to the primary source G1, the switch Q3 is modulated.

In FIG. 15, the asynchronous single-switch buck conversion movement of energy from the secondary source G2 to the primary source G1, at step 1, all of the switches are open. At step 2, the switch Q3 is closed discharging the higher voltage secondary source G2 into the inductor L1. At step 3, the voltage across the inductor has decreased to the point that the diode D1 begins to forward conduct current directly from G2 to G1. Note that depending on the rate of switching and time spent in step 2, step 3 may be skipped entirely. At step 4, the switch Q3 is opened and the diode D3 begins forward conducting to discharge the inductor L1 into the lower voltage primary source G1. These steps are repeated so long as single-switch buck conversion movement of energy from the secondary source G2 to the primary source G1 in asynchronous mode is desired.

In FIG. 16, synchronous mode single-switch buck conversion movement of energy from the secondary source G2 to the primary source G1, at step 1, all of the switches are open. At step 2, the switch Q3 is closed to discharge the higher voltage secondary source G2 into the inductor L1. At step 3, the voltage across the inductor has decreased to the point that the diode D1 begins to forward conduct current directly from G2 to G1. Note that depending on the rate of switching and time spent in step 2, step 3 may be skipped entirely. At step 4, the switch Q3 is opened and the diode D1 begins forward conducting to discharge the inductor L1 into the lower voltage primary source G1. At step 5, the switch Q1 is closed to provide an additional lower resistance path for the discharge of energy from the inductor L1 into the lower voltage primary source G1. These steps are repeated so long as single-switch buck conversion movement of energy from the secondary source G2 to the primary source G1 in synchronous mode is desired.

In the single-switch modulation modes, as with the two-switch modulation modes, the rate of energy flow is a function of the time spent in step 2 ("on-time") charging the inductor. A longer on-time moves more energy from the energy source (primary source G1 or secondary source G2) into the inductor L1, whereas a shorter on-time moves less energy from the energy source into the inductor L1.

The two-switch modulation modes (FIGS. 5-8) can perform buck or boost conversion without changing the switching sequences. With single-switch modulation (FIGS. 9-16), the system has to determine which switch to modulate depending on whether the system is performing buck or boost conversion. In the case of single-switch modulation, if the system is operating in buck-conversion mode (moving energy from the higher voltage source to the lower voltage destination), at some point the voltage of the destination will become higher than the voltage of the source. At this transition point, the system needs to convert to boost-conversion mode to continue moving energy from the same source to the same destination.

Single-switch modulation can move more energy with shorter on-times. Two-switch modulation modes need a minimum ratio of on-time to off-time to be reached before energy can be effectively moved. The reason for this minimum on-time difference comes from the reference point for the energy discharge from the inductor L1. In two-switch operation, the voltage across the inductor L1 is referenced relative to the negative terminal of the energy sink. Therefore more energy, which corresponds to voltage, needs to be stored in the inductor L1, before energy flow to the sink will begin. In single-switch modulation, the inductor L1 is always referenced to the positive terminal of the energy source. When single switch modulation is used, the flow of energy is always relative to the positive terminal of the energy source. In the event that this is a boost transfer, energy will flow directly from the higher voltage source to the lower voltage sink. In the event of a boost transfer, the voltage across the inductor will only need to be the difference in voltages between the energy sink and the energy source.

Single-switch modulation also dissipates less power in system losses. Each switch (and diode) dissipates a certain amount of energy, in the form of heat, as it is operating. The switching losses (opening and closing) are proportional to the frequency of modulation, and the conduction losses are a function of the amount of energy being transferred. The conduction losses differ depending on the type of device (e.g. MOSFET, IGBT, etc.) being used. With two-switch modulation, there is always a fixed amount of switching losses and conduction losses given a specific amount of energy being transferred. While operating in single switch modulation modes, the switching losses are halved when compared to two-switch modulation modes, due to half as many switches being modulated. As compared to two-switch modulation modes, conduction losses for single-switch modulation in boost mode are the same and conduction losses for single-switch modulation in buck mode are approximately halved. While operating in single-switch modulation mode either in buck or boost mode, less energy loss is incurred than in two-switch modulation modes.

Interlaced Power Switching Devices

Figure 17:
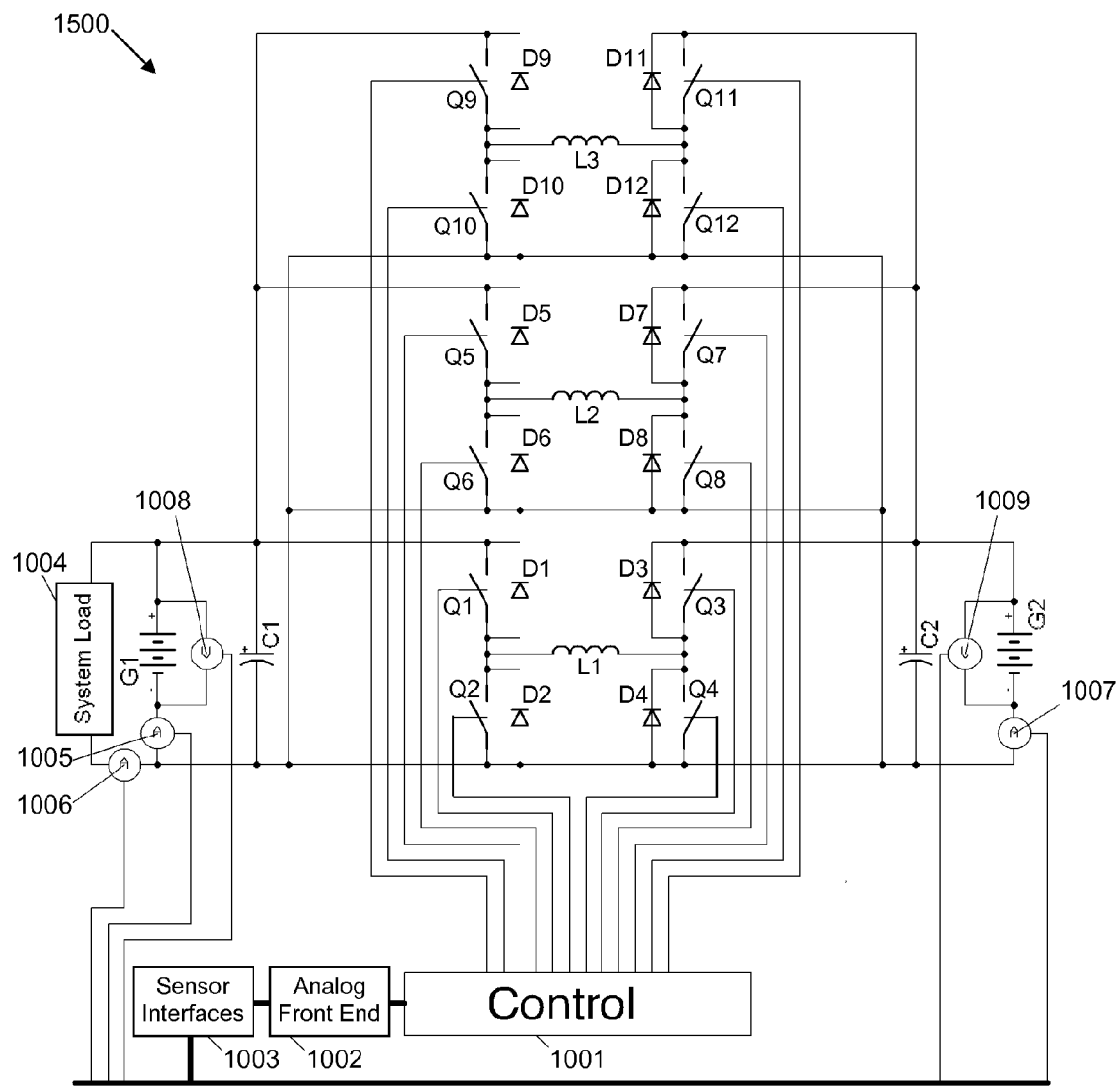
FIG. 17 shows an exemplary embodiment of an interlaced switching energy management system with four-switch topology utilizing three parallel sets of switches.

Other embodiments of the energy management system can use multiple sets of switches in parallel. FIG. 17 shows an exemplary embodiment of an interlaced switching energy management system 1500 with four-switch topology utilizing three parallel sets of switches. The exemplary interlaced switching embodiment 1500 is based on the four-switch embodiment 1000 of FIG. 3. The interlaced switching embodiment 1500 includes two additional sets of four switches and corresponding diodes, and two additional inductors.

The interlaced switching embodiment 1500, like the four switch topology 1000, includes a system load 1004; a primary energy source G1; a secondary energy source G2; a first set of switches Q1, Q2, Q3, and Q4; a first set of diodes D1, D2, D3, and D4; a first inductor L1; and capacitors C1 and C2. The relative coupling and placement of these components in the interlaced switching embodiment 1500 is similar to the coupling and placement in the four switch topology 1000. The first inductor L1, and the first set of switches Q1, Q2, Q3, and Q4 with parallel diodes D1, D2, D3, and D4, respectively, forms a first switching module.

The interlaced switching embodiment 1500 also includes a second switching module that includes a second inductor L2; and a second set of switches Q5, Q6, Q7, and Q8 with associated parallel diodes D5, D6, D7, and D8, respectively. The arrangement of this second set of switch diode pairs Q5-D5, Q6-D6, Q7-D7 and Q8-D8 and the second inductor L2 in the second switching module is similar to the arrangement of the first set of switch diode pairs Q1-D1, Q2-D2, Q3-D3 and Q4-D4 and the first inductor L1 in the first switching module.

The interlaced switching embodiment 1500 also includes a third switching module that includes a third inductor L3; and a third set of switches Q9, Q10, Q11, and Q12 with associated parallel diodes D9, D10, D11, and D12, respectively. The arrangement of the third set of switch-diode pairs and the third inductor in the third switching module is similar to the arrangement of the first and second sets of switch-diode pairs and the corresponding inductors in the first and second switching modules. The first, second and third switching modules are each in parallel with one another in the interlaced switching embodiment 1500.

This interlaced switching embodiment 1500, like the four switch topology 1000, also includes a control module 1001, an analog front end 1002, a sensor interface 1003, ammeters 1005, 1006, and 1007; and voltmeters 1008 and 1009. The functions of these elements in the interlaced switching embodiment 1500 corresponds to the functions of these elements in the four switch topology 1000 except that the control module 1001 in the interlaced switching embodiment 1500 controls three sets of four switches (twelve switches) instead of one set of four switches.

Paralleling switches enables the use of components with smaller capacities. Smaller components are typically more readily available and lower cost. Paralleling switches also reduces parasitic losses. While some losses are directly proportional to the current passing through a device (e.g. diode conduction), resistive losses, such as those through wires, interconnects, and/or field-effect transistors increase proportionally to the square of the current. Therefore, if the current is halved, then the resistive losses are reduced by a factor of four.

While it is not required to synchronize the modulation of the switches in the three switching modules, synchronization can provide advantages. Traditional synchronization would align the on-times of each of the sets of switching devices in the switching modules. Advantages can be achieved by synchronizing the switches to be out of phase with each other. If the modulation steps are placed against a time line, with a particular frequency of repetition, then each switch sequence would start 360/n degrees out of phase, where 'n' is the number of switching modules operated in parallel. If 'n' is 3, as in the embodiment shown in FIG. 17, then each switch sequence would be 120 degrees out of phase. If 'n' is 5, then each switch sequence would be 72 degrees out of phase. This process of offsetting the start times of the switch sequences is a process known as interlacing. The advantage to interlacing is that it reduces the ripple currents seen by the bulk capacitors C1 and C2. By reducing the ripple current, the lifetime of the components can be extended, increasing the lifetime of the system.

Figure 18:
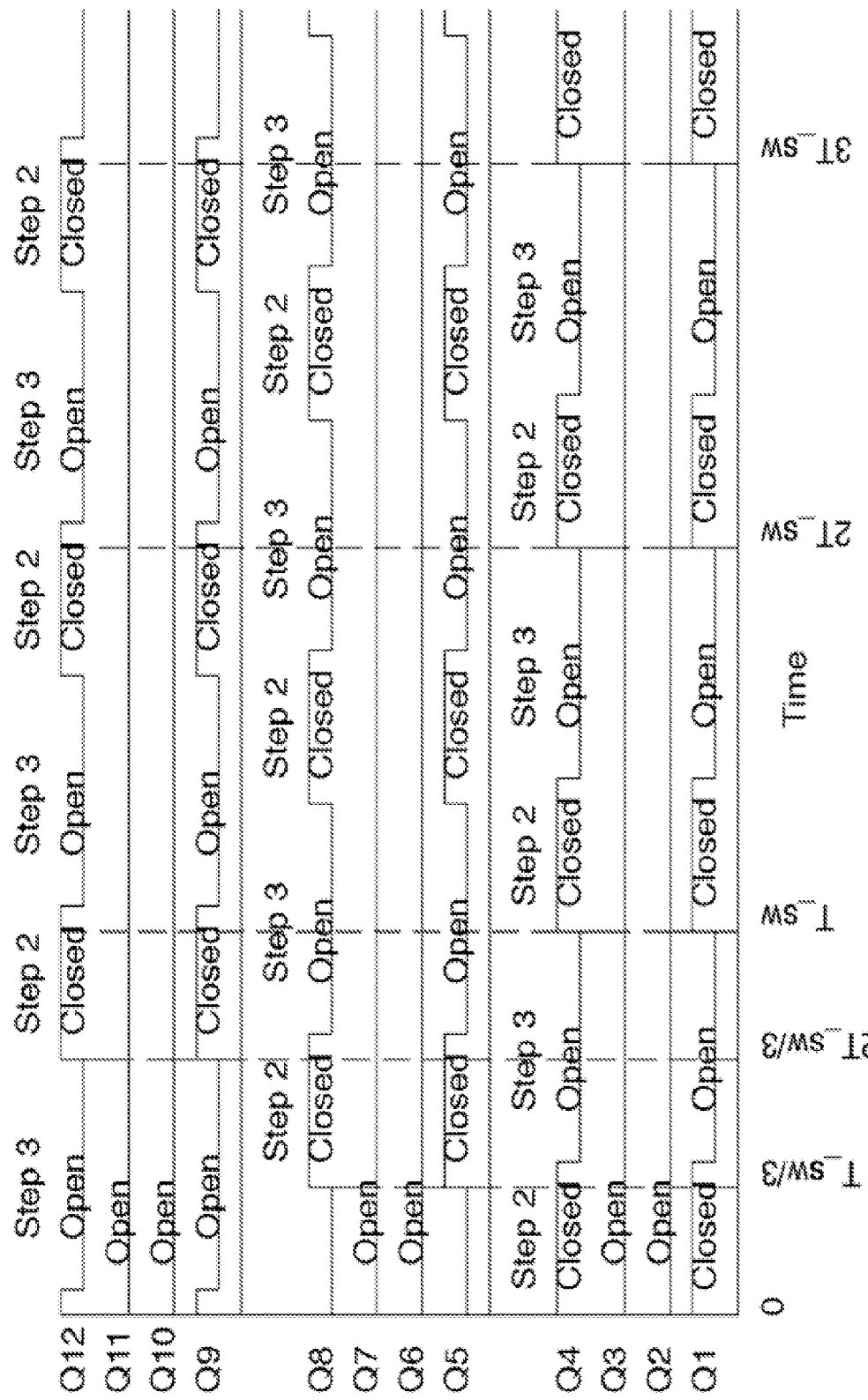
FIG. 18 is a timing diagram showing an example of the timing of the switches in the interlaced switching system of FIG. 17.

FIG. 18 is a timing diagram showing an example of the timing of the switches in the interlaced switching system 1500. If the frequency of repetition is f_sw, then the time period of this repetition, T_sw, is the inverse of the frequency (1/f_sw). Given that this embodiment utilizes three sets of switches, the offset time is one third of the period of repetition, T_sw/3. The timing diagram in FIG. 18 shows the asynchronous mode primary to secondary modulation. The switches Q1 through Q4 of the first switching module follow the switching pattern shown in FIG. 5. The timing diagram shows that the pattern of switches Q1 through Q4 is repeated every T_sw. The switches Q5 through Q8 of the second switching module follow the same pattern, but are offset in time by T_sw/3 (120 degrees). The switches Q9 through Q12 of the third switching module follow the same switching pattern, but are offset in time by 2*T_sw/3 (240 degrees). While this example shows asynchronous mode primary to secondary modulation, this interlaced timing can be used for any of the modulation modes.

Figure 19:
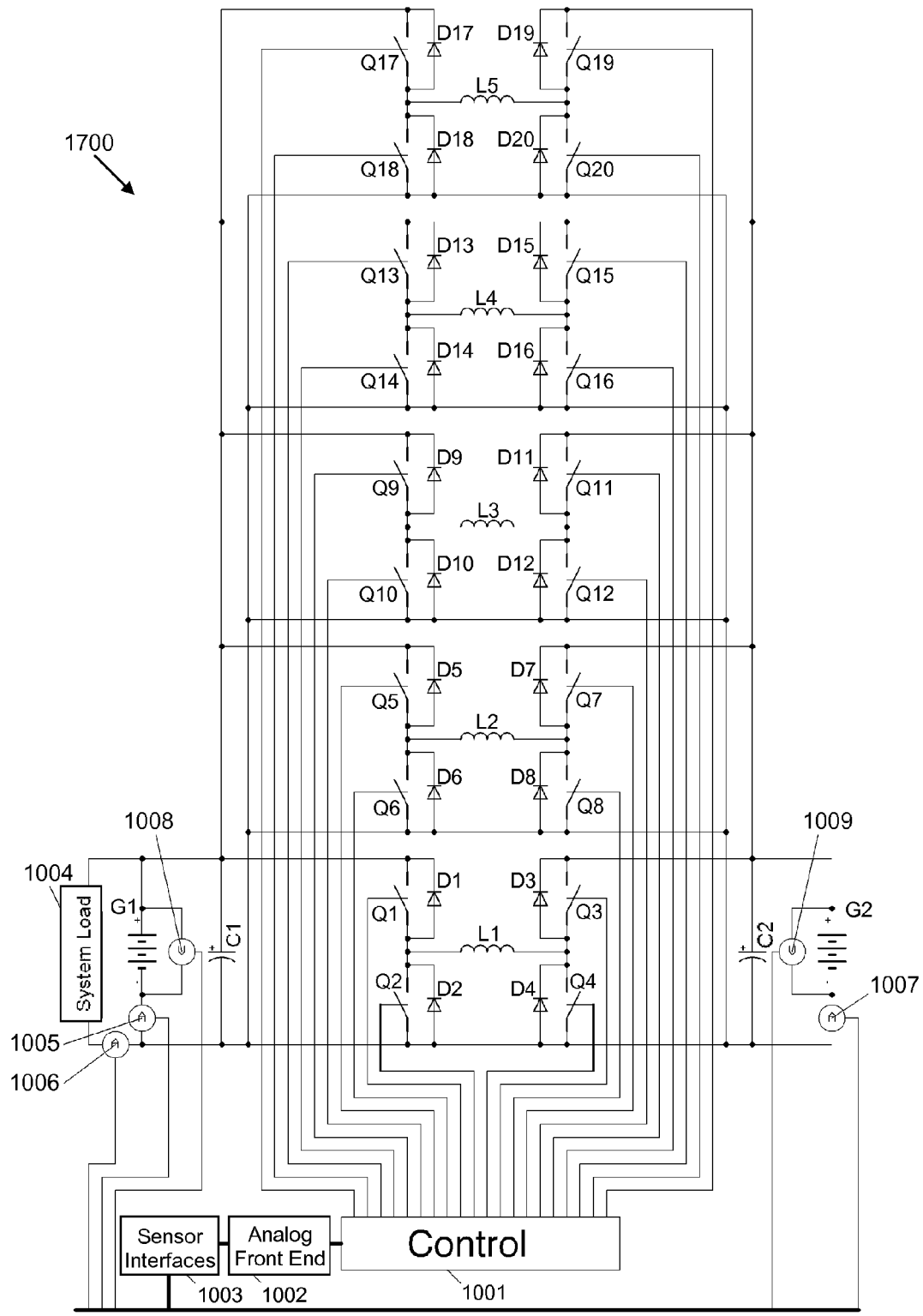
FIG. 19 shows an exemplary embodiment of an interlaced switching energy management system with four-switch topology utilizing five parallel sets of switches.

Another exemplary embodiment of an interlaced system 1700 that includes five sets of parallel switching modules in shown in FIG. 19. The interlaced switching embodiment 1700, like the three switching module system 1500 and the single switching module system 1000, includes a system load 1004; a primary energy source G1; a secondary energy source G2; a first set of switches Q1, Q2, Q3, and Q4; a first set of diodes D1, D2, D3, and D4; a first inductor L1; and capacitors C1 and C2. The relative coupling and placement of these components in the interlaced switching embodiment 1700 is similar to the coupling and placement in the four switch topology 1000 and the three switching module embodiment 1500. The interlaced switching embodiment 1700, like the three switching module embodiment 1500, also includes the first, second and third switching modules which include inductors L1-L3, switches Q1-Q12 and diodes D1-D12.

In addition, interlaced switching embodiment 1700 includes fourth and fifth switching modules. The fourth switching module includes a fourth inductor L4; and a fourth set of switches Q13-Q16 with associated parallel diodes D13-D16, respectively. The fifth switching module includes a fifth inductor L5; and a fifth set of switches Q17-Q20 with associated parallel diodes D17-D20, respectively. The arrangement of the inductor, switches and diodes in the fourth and fifth switching module is similar to the arrangement of the inductor, switches and diodes in the first, second and third switching modules. The first, second, third, fourth and fifth switching modules are each in parallel with one another in the interlaced switching embodiment 1700.

This interlaced switching embodiment 1700 also includes a control module 1001, an analog front end 1002, a sensor interface 1003, ammeters 1005, 1006, and 1007; and voltmeters 1008 and 1009. The functions of these elements in the interlaced switching embodiment 1700 corresponds to the functions of these elements in the single module embodiment 1000 and the three module embodiment 1500 except that the control module 1001 in the interlaced switching embodiment 1700 controls five sets of four switches (twenty switches) instead of one set of four switches (four switches) or three sets of four switches (twelve switches).

Figure 20:
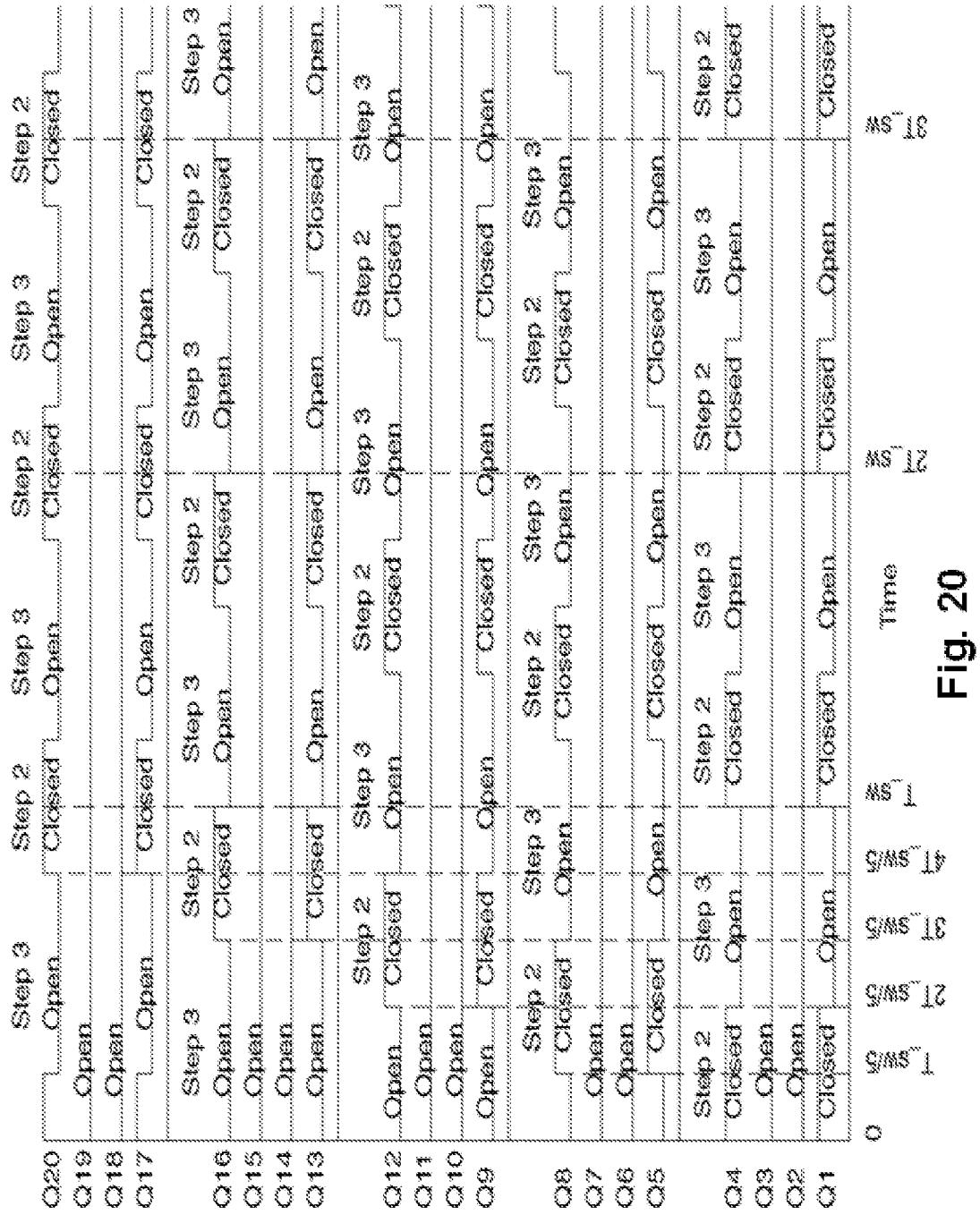
FIG. 20 is a timing diagram showing an example of the timing of the switches in the interlaced switching system of FIG. 19.

FIG. 20 is a timing diagram showing an example of the timing of the switches in the interlaced switching system 1700. Following the mathematical timing formulas set out above, the offset time for the switching modules would be T_sw/5. The timing diagram also shows asynchronous mode two-switch primary to secondary modulation. The switches Q1 through Q4 of the first switching module follow the pattern shown in FIG. 5, and repeat with a period of T_sw. The switches Q5 through Q8 of the second switching module follow the same pattern, but are offset in time by T_sw/5. The switches Q9 through Q12 of the third switching module again follow the same switching pattern, but are offset in time by another T_sw/5, or 2*(T_sw/5). The switches Q13 through Q16 of the fourth switching module follow the same switching pattern, but are offset in time by another T_sw/5, or 3*(T_sw/5). Finally, the switches Q17 through Q20 of the fifth switching module follow the same pattern, but are offset in time by another T_sw/5, or 4*(T_sw/5). The sequence repeats again with the first switching module in the next switching period 2*T-sw, and continues as long as the same switching modulation is desired.

Modular System

Since a single energy management system unit, such as exemplary embodiments 1000, 1500 and 1700, can operate independently to create a certain energy flow rate; multiple energy management system units can be placed in parallel to work in concert with one another to generate an aggregate energy flow rate.

Figure 21:
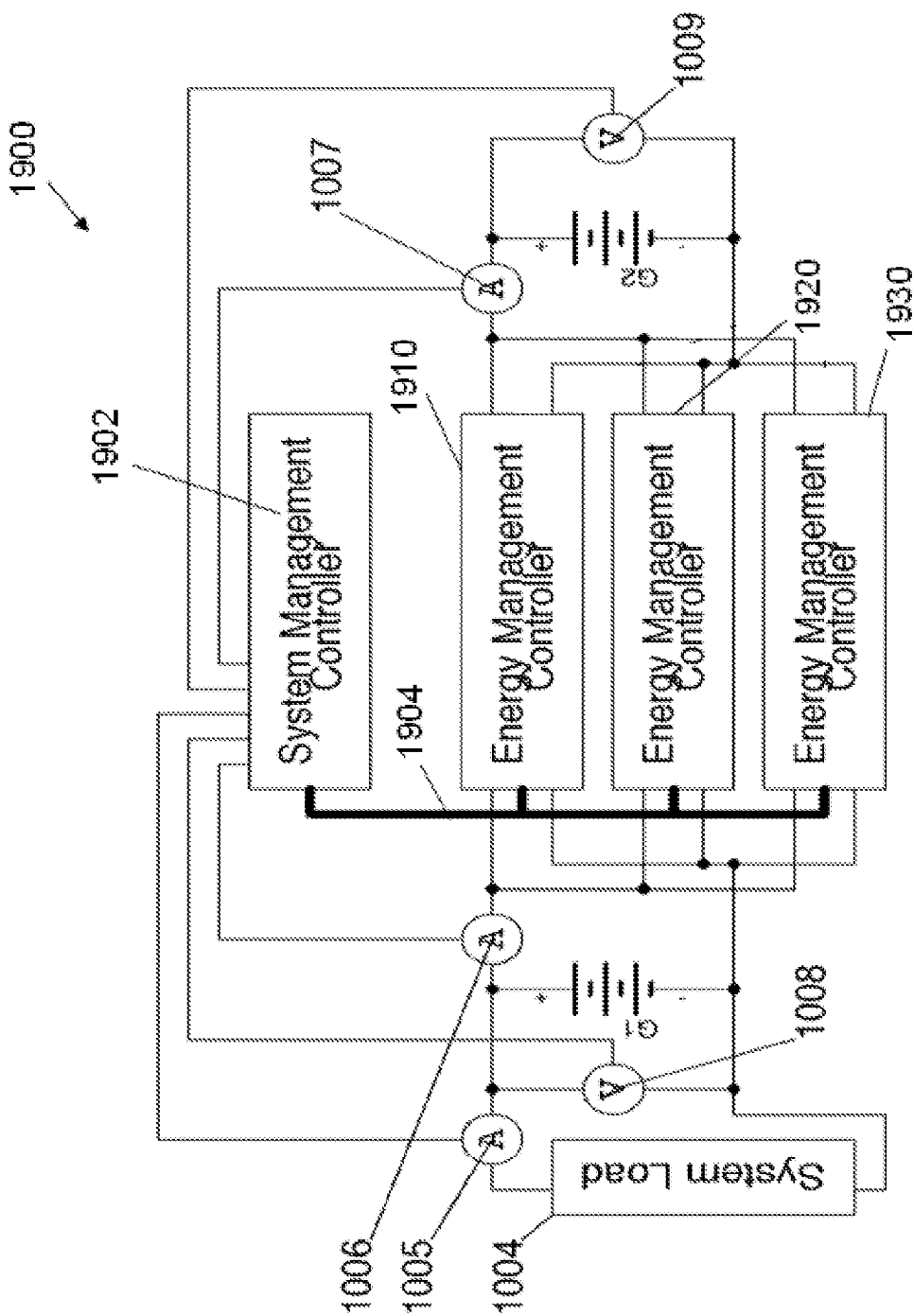
FIG. 21 shows an exemplary embodiment of a modular multiple unit energy management system including three energy management controllers and two energy sources.

FIG. 21 shows an exemplary embodiment of a multiple energy management system 1900. The multiple energy management system 1900 includes a primary source G1, a secondary source G2, a system load 1004, a system management controller 1902 and three energy management system units 1910, 1920 and 1930 connected in parallel. Each of the energy management units 1910, 1920, 1930 is placed in parallel with the energy sources G1 and G2, and the energy source G1 is placed in parallel with the system load 1004.

The exemplary multiple energy management system 1900 also includes the sensor system including ammeters 1005, 1006, and 1007; and voltmeters 1008 and 1009. The readings from each of the sensors is monitored by the system management controller 1902, and the system management controller 1902 controls each of the three energy management units 1910, 1920, 1930 to move a specific amount of energy between the two energy sources, G1 and G2. Note that the flows through each of the energy management units 1910, 1920, 1930 do not have to be equal. The aggregate energy flow rate is the sum of the individual flows through the three energy management units 1910, 1920, 1930. The modularity allows the aggregate energy management system 1900 to be expandable to fit the desired specifications of the total system. Additionally the multi-unit system 1900 can be expanded after initial construction by placing additional energy management units in parallel with the existing energy management units. There is no theoretical limit to the number of units that can be placed in parallel, though specifics of the design of the system can impose practical limits.

As shown in FIG. 21, the multi-unit system 1900 includes a single system management controller 1902 and multiple energy management controllers 1910, 1920, 1930. An additional system management controller can be added to provide redundancy to system level control of the multi-unit system 1900, but the additional system controllers are not required for system operation. The system management controller 1902 is connected via a communications bus 1904 (e.g., RS-485, Ethernet, 4-20 mA, etc.) to each of the energy management controllers 1910, 1920, 1930. Each of the energy management controllers 1910, 1920, 1930 is connected to one or more energy sources and one or more energy sinks Note that an energy storage device, such as a battery, can be both an energy source and an energy sink.

The embodiment shown in FIG. 21 blends two energy sources, G1 and G2, together through three energy management controllers 1910, 1920, 1930. The system load 1004 is placed in parallel with the primary energy source G1. The system management controller 1902 receives sensor data from ammeters 1005, 1006, and 1007 and voltmeters 1008 and 1009. This data is then processed by the system management controller 1902 to determine how much energy needs to be moved through the multi-unit system 1900. The system management controller 1902 communicates through a communications bus 1904 to each of the energy management controllers 1910, 1920, 1930. The system management controller 1902 sends commands through the communications bus 1904 to tell each of the energy management controllers 1910, 1920, 1930 how much energy to move. The communications bus 1904 can also transmit status data from the energy management controllers 1910, 1920, 1930. The status data can be used to influence the apportionment of aggregate energy flows through each of the energy management controllers 1910, 1920, 1930. If each energy management controller has an equal current capacity of I_max, then the maximum aggregate current through the system would be 3*I_max.

Figure 22:
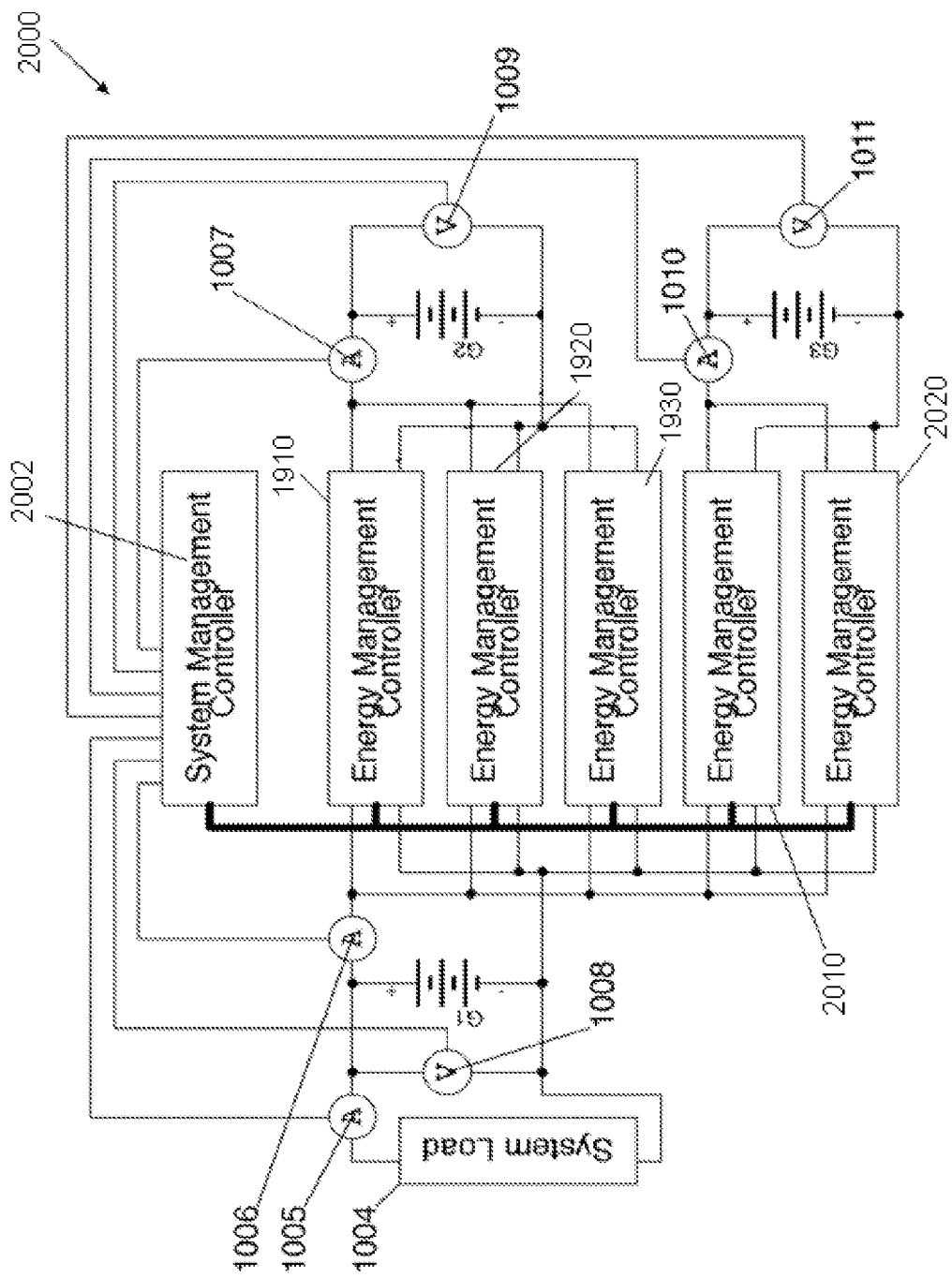
FIG. 22 shows an exemplary embodiment of a modular multiple unit energy management system including five energy management controllers and three energy sources.

FIG. 22 shows another exemplary embodiment of a modular multi-unit energy management system 2000. The multiple energy management system 2000 includes the primary source G1, the secondary source G2, the system load 1004, and the three parallel energy management system units 1910, 1920 and 1930 of the modular multi-unit system 1900. The exemplary multiple energy management system 2000 also includes the sensor system including ammeters 1005, 1006, and 1007; and voltmeters 1008 and 1009. These components are placed and coupled as described with respect to the modular multi-unit system 1900 of FIG. 21.

The modular multi-unit system 2000 also includes a system management controller 2002, two additional energy management controllers 2010, 2020, and a third energy source G3. The multi-unit system 2000 also includes an ammeter 1010 and a voltmeter 1011 to measure the current and voltage, respectively, of the third energy source G3. Each of the energy management units 2010, 2020 is placed in parallel with the energy sources G1 and G3.

The system management controller 2002 controls each of the three energy management units 1910, 1920, 1930 to move a desired amount of energy between the two energy sources G1 and G2; and the system management controller 2002 controls each of the two energy management units 2010, 2020 to move a desired amount of energy between the two energy sources G1 and G3. Note that the flows through each of the energy management units do not have to be equal. The aggregate energy flow rate is the sum of the individual flows through the five energy management units. If each energy management controller has an equal current capacity of I_max, then the multi-unit system 2000 could move 3*I_max between sources G1 and G2, and 2*I_max between sources G1 and G3. Energy can be moved indirectly between sources G2 and G3. To move energy between sources G2 and G3, the energy can flow through source G1.

The multi-unit system 2000 shows that the individual energy management controllers do not need to be connected to the same energy sources or sinks. The individual energy management controllers do not even have to share a single common node, as in this embodiment. The system management controller just needs knowledge of what energy source(s) and sink(s) are connected to which energy management controller(s).

With an embodiment like the multi-unit system 2000, the two secondary sources G2 and G3 can be used to supplement the primary source G1. In this case the system load 1004 could be supplied with the maximum current available from the two secondary sources G2 and G3 without drawing any energy from the primary source G1. While the full load does not need to be sourced from each of the batteries, if the secondary sources G2 and G3 have optimal rates of discharge, the system management controller 2002 can target these optimal rates of discharge, so that the required energy can be supplied to the system load 1004 while limiting the damage to the secondary sources G2 and G3.

The function of the system management controller is to estimate the current state of the total system, including all of the energy sources, sinks, and storage devices coupled to the total system. Depending on the state of the system, and any external user input, the system management controller can issue commands to each of the attached energy management controllers to move a specified amount of energy. The system management controller can also receive information from each energy management controllers so that energy can be apportioned among the energy management controllers as desired.

Each energy management controller is responsible for moving an amount of energy as specified by the system management controller. Each energy management controller can include logic to protect itself from over-voltage, over-current, and over-temperature conditions. In the event that any of these conditions occur, the energy management controller can 'throttle-back', or reduce the amount of energy being transferred, until the condition corrects itself. If the condition continues, or reaches a pre-specified fault limit, then the energy management controller can go into a fault mode, shut down, stop energy transfer or take some other action. The fault condition can be reported back to the system management controller.

Figure 23:
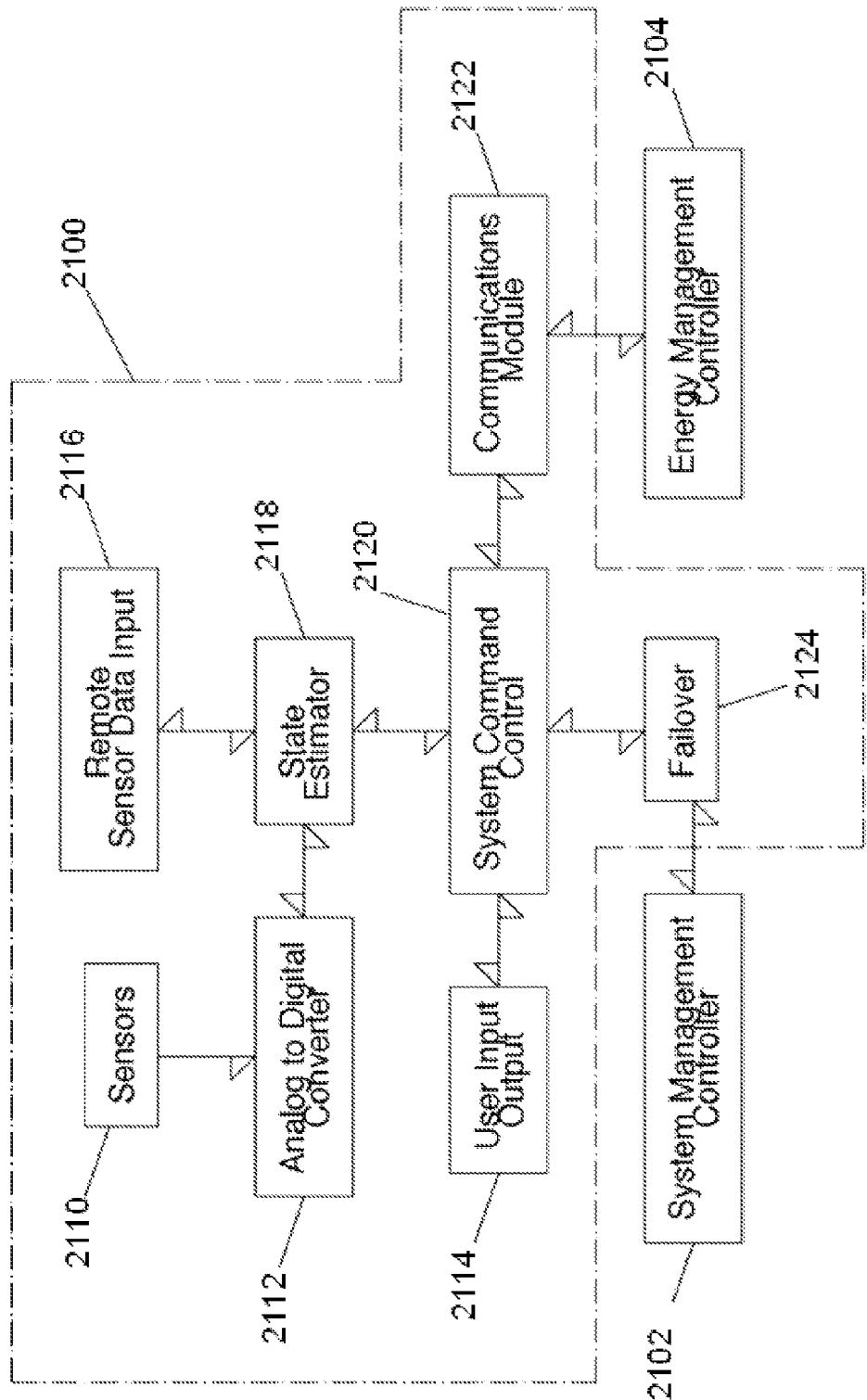
FIG. 23 shows an exemplary embodiment of a system management controller.

FIG. 23 shows an exemplary embodiment of a system management controller 2100. The system management controller 2100 includes several components with specific functionalities. This exemplary embodiment of the system management controller 2100 includes sensor input 2110, an analog-to-digital converter 2112, user input-output module 2114, remote sensor data input 2116, a state estimator 2118, a system command and control module 2120, a communications module 2122 and a failover module 2124. The system management controller 2100 can be coupled to one or more other system management controller 2102 and one or more energy management controllers 2104.

The sensor input 2110 receives the readings from the voltmeters and ammeters of the energy management system and transmits the readings to the analog-to-digital converter 2112 where they are processed and digitized. The analog-to-digital converter 2112 sends the digitized readings to the state estimator 2118. The remote sensor data input 2116 receives data from remote sensor systems (e.g. energy management controller internal sensors, battery state-of-charge sensors) and sends the digitized remote sensor readings to the state estimator 2118. Using the data from the various sensors, the state estimator 2118 can determine an estimate of the state of the energy management system as well as the connected energy source(s) and sink(s). The state estimator 2118 sends the state estimate to the system command and control module 2120. The system command and control module 2120 can also receive user input from input device(s) of the user input/output module 2114. The user input device(s) can include keyboard, mouse, touchscreen, wireless device or any of various other user input devices. All of this input is processed by the system command and control module 2120 to determine what actions the energy management system should take. Any feedback from the system command and control module 2120 for the user is sent back through output device(s) of the user input-output module 2114. The user output device(s) can include display screen, printer, console indicators, wireless device or any of various other user output devices.

Specific commands for any of the energy management controllers 2104 are sent by the system command and control module 2120 to the communications module 2122 which sends them to the desired energy management controller 2104. The communications module 2122 can also receive status data and command responses from the energy management controller(s) 2104, which is forwarded to the system command and control module 2120.

The exemplary system management controller 2100 also includes the optional failover and redundancy module 2124. In this scheme, a backup system management controller 2102 connects through the failover module 2124. Data can be actively exchanged between the two system management controllers to show that they are both active. In this scheme, one of the two system management controllers is considered the master and the other a backup. If the master system management controller should fail, or stop transmitting failover data to the backup system management controller for a certain time, the master system management controller will be demoted and the backup system management controller will take over the duties as master. The backup system management controller is also coupled to the sensors, user devices and energy management controller(s) through its own components.

Figure 24:
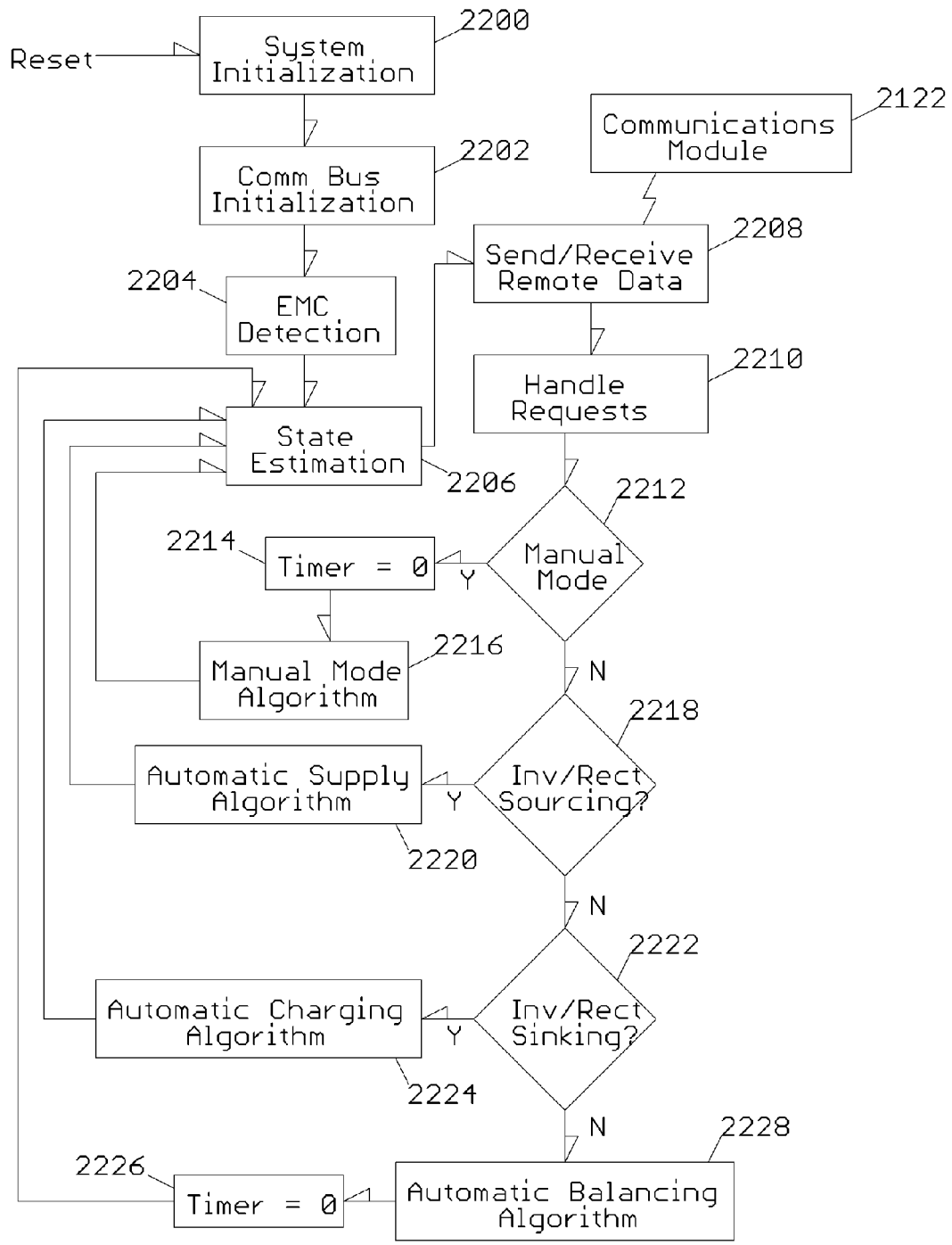
FIG. 24 shows an exemplary embodiment of the control method for a system command and control module.

FIG. 24 shows an exemplary embodiment of the control method for the system command and control module 2120. At block 2200, the system runs through a system initialization which can be used to enable all of the hardware and read any configuration data out of non-volatile storage. At block 2202, the communications bus is initialized. Depending on the modality of communications, this may be some sort of reset signal on the bus, or other enabling function. At block 2204, the system detects all of the energy management controllers (EMCs) connected to the system. The automatic detection of the EMCs provides the end user with the flexibility in system implementation. These three steps comprise the system start-up sequence.

Once the system start-up is completed, an operations loop is executed. The operations loop begins at block 2206 with an estimation of the system's state. This state estimation can include external bus conditions, energy source state of charge (SoC), state of health (SoH), and state of life (SoL), as well as EMC health. At block 2208, data is sent and received via the communications module 2122. At block 2210, any received messages or requests are processed. At block 2212, the system checks whether manual mode has been specified. If manual mode is not specified, control is passed to block 2218.

Manual mode is a manual override that can be enabled so that the system will not react automatically to the conditions of the system load but operate as specified by the user. If manual mode is selected, at block 2214, a timer is reset and, at block 2216, a manual mode procedure is executed. The timer can be used by the automatic modes, and its purpose will be explained below. An exemplary embodiment of the manual mode procedure is described below with reference to FIG. 25. After executing the manual mode procedure, the system returns to the state estimation at block 2206.

If the system is not in manual mode, the condition of the system load is checked. In this exemplary embodiment, the system load is expected to be an Inverter/Rectifier. At block 2218, the system checks whether energy is being sourced to the system load. If energy is not being sourced to the system load, control is passed to block 2222. If the system is sourcing energy to the system load, then, at block 2220, the automatic supply procedure is executed. An exemplary embodiment of the automatic supply procedure is described below with reference to FIG. 26. After completion of the automatic supply procedure, the system returns to the state estimation at block 2206.

If energy is not being sourced to the system load, at block 2222, the system command and control module checks whether the system load is producing power. If energy is not being returned from the system load, control is passed to block 2228. If energy is being returned from the system load, then at block 2224, the automatic charging procedure is executed. An exemplary embodiment of the automatic charging procedure is described below with reference to FIG. 27. After completion of the automatic charging procedure, the system returns to the state estimation at block 2206.

If the system is idle, neither sinking nor sourcing energy, then at block 2228, the system checks for any Automatic Balancing between the energy sources. An exemplary embodiment of the automatic balancing procedure is described below with reference to FIG. 28. After completion of the automatic balancing procedure, control is transferred to block 2226 where the timer for automatic control is reset, and then control returns to the state estimation at block 2206.

Figure 25:
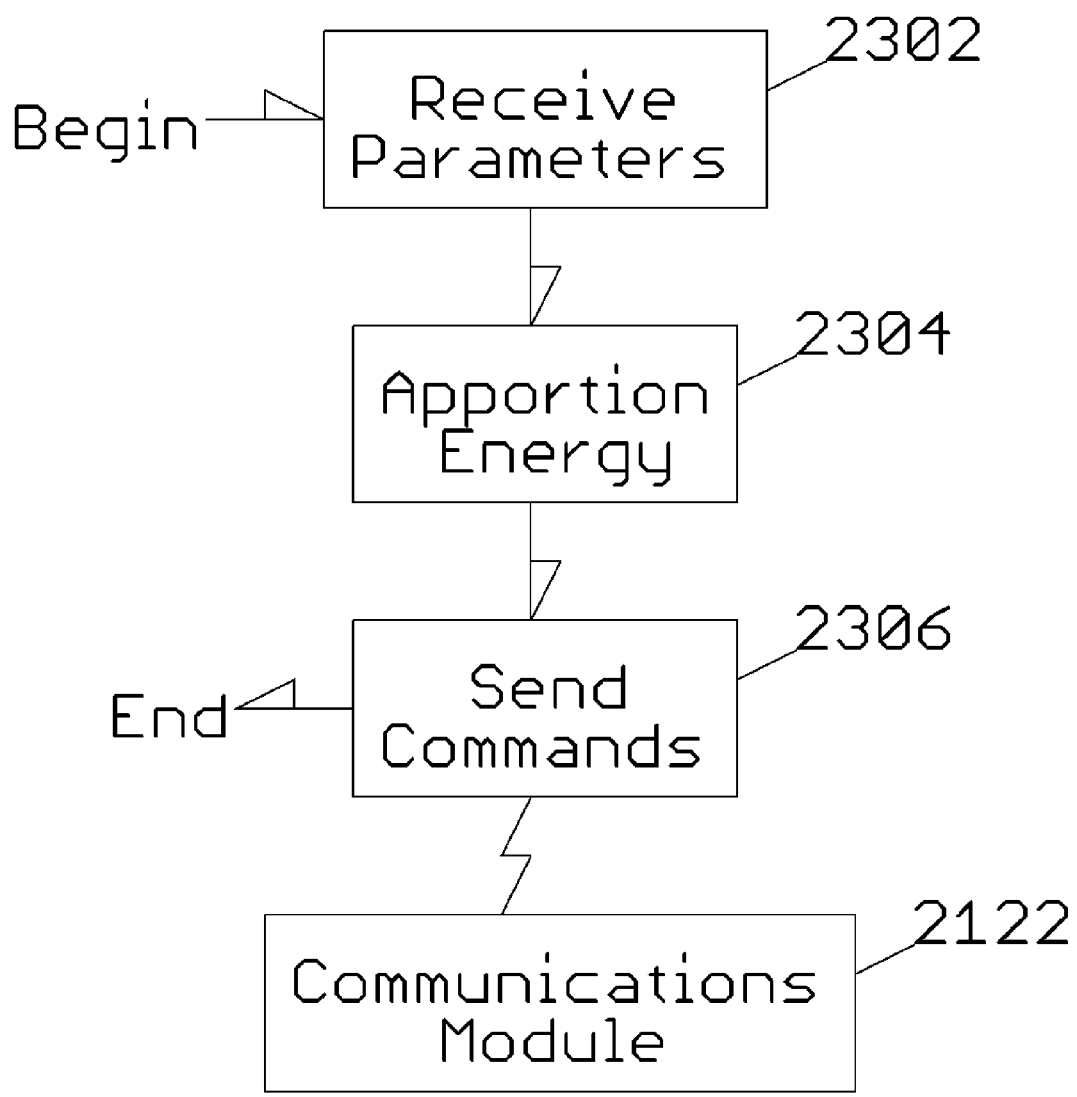
FIG. 25 shows an exemplary embodiment of a manual mode procedure.

FIG. 25 shows an exemplary embodiment of the manual mode procedure. At step 2302, the manual mode parameters are received from memory. These parameters are ultimately received from the user in the form of a request that is handled at block 2210 of the system command and control procedure described in FIG. 24. Once the parameters are received, at block 2304, the energy is apportioned according to an apportion energy procedure. The apportion energy procedure determines how much energy will be moved through each of the attached EMCs to meet the desired goal. The simplest apportion energy procedure would be to evenly divide all of the energy flow across all of the available EMCs. Other procedures may take into account, but are not limited to, the current state of the attached energy sources (SoC, SoL, and SoH) as well as the health of the individual EMCs. At step 2306, the control commands for the apportion energy procedure are sent to the individual EMCs via the communications module 2122. After the control commands are sent, the manual mode procedure is exited.

Figure 26:
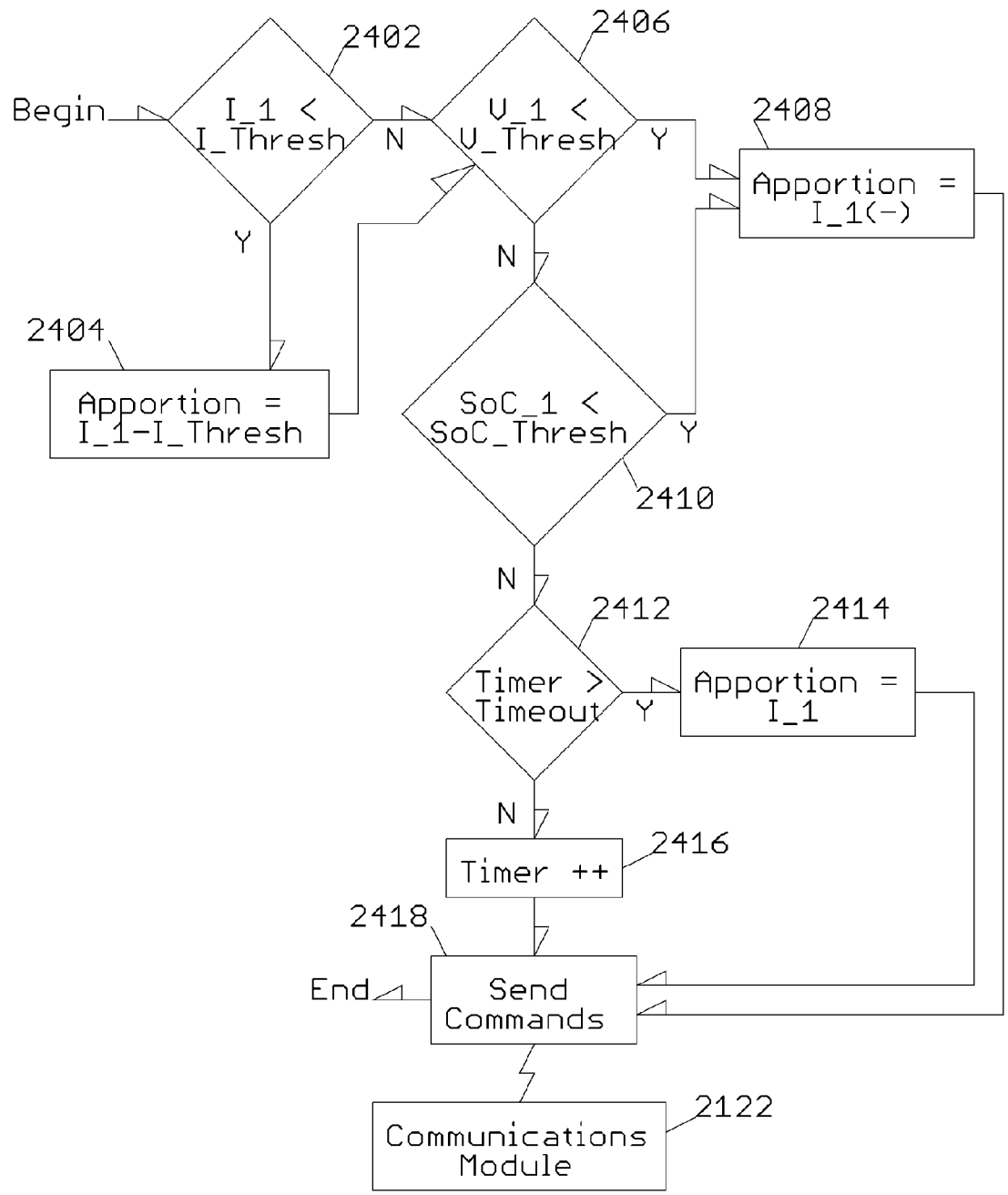
FIG. 26 shows an exemplary embodiment of an automatic supply procedure.

FIG. 26 shows an exemplary embodiment of the automatic supply procedure. In the description of this procedure, I_1 is the current output to the system load; V_1 is the voltage of the source G1; and SoC_1 is the State of Charge of the source G1. By sign convention, I_1, I_thresh, and I_1(−) will all be negative, because we are supplying current to the system load. At block 2402, the current supplied to the system load (I_1) is compared to the discharge current limit (I_thresh) of the source G1. If I_1 is beyond the limit of the discharge current (more negative) then control is passed to block 2404; otherwise control is passed to block 2406. At block 2404 the difference in current (I_1−I_thresh) is apportioned by the system, and then control passes to the G1 voltage check at block 2406. Apportionment of the current refers to the assignment of specific target currents (or energy flows) to individual modules controlled by the system. This apportionment can be done based on a variety of inputs including, but not limited to, source (G1, G2) voltage, current module temperature, current source (G1, G2) health, and current source (G1, G2) temperature.

If the current is not beyond the discharge current limit, then at block 2406 the voltage of the source G1 is checked against an under-voltage threshold (V_Thresh). If the source G1 is under-voltage then control is passed to block 2408; otherwise control is passed to block 2410. At block 2408, all of the system load's current as well as an extra amount is apportioned by the system to charge the source G1, and control is passed to block 2418 where the necessary commands are sent to the individual EMCs.

If the source G1 is not under-voltage, then at block 2410 the State of Charge (SoC) is checked against a minimum limit (SoC_Thresh). If the SoC of the source G1 is less than the SoC_Thresh then control is passed to block 2408; otherwise control is passed to block 2412. At block 2408, all of the system load's current as well as an extra amount is apportioned by the system to charge the source G1, and control is passed to block 2418 where the necessary commands for the apportionment are sent to the individual EMCs.

At block 2412, the automatic Timer is checked against a timeout parameter. The purpose of the Timer is to allow for the energy source G2, which may be an energy battery, to be used as the primary source should the condition of supplying to the load exist for an extended period of time. It is assumed in this embodiment of algorithm that source G1 is a power battery of limited capacity that can source large amounts of current for short periods of time. Once this time limit is exceeded, energy will need to be sourced from another energy source, in this case source G2. If the Timer has accrued past the timeout parameter, then it is assumed that the system load's condition has existed for long enough and at block 2414 energy is sourced from the other energy sources and control is passed to block 2418 where any necessary commands are sent to the EMCs. If the Timer has not reached the timeout parameter, then at block 2416 the Timer is incremented and control is passed to block 2418. At block 2418 any pending apportionment commands are sent to the EMCs via the communications module 2122.

Figure 27:
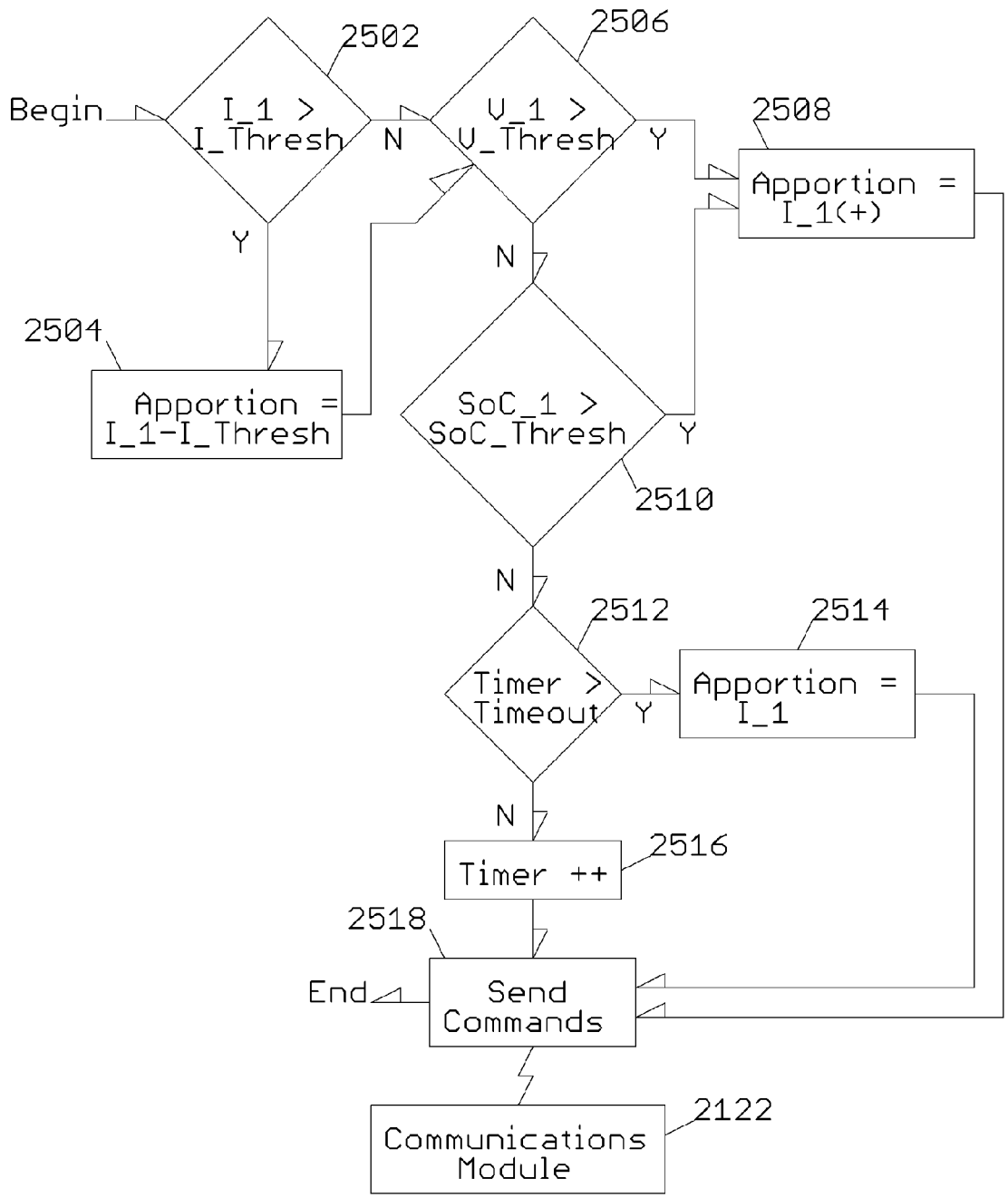
FIG. 27 shows an exemplary embodiment of an automatic charging procedure.

FIG. 27 shows an exemplary embodiment of the automatic charging procedure. In the description of this procedure, I_1 is the current input from the system load; V_1 is the voltage of the source G1; and SoC_1 is the State of Charge of the source G1. At block 2502, the current supplied by the system load (I_1) is compared to the charge current limit (I_thresh) of the source G1. If I_1 is beyond the limit of the charge current then control is passed to block 2504; otherwise control is passed to block 2506. At block 2504 the difference in current (I_1−I_thresh) is apportioned by the system, and then control passes to the G1 voltage check at block 2506. As with the manual mode procedure, apportionment has a variety of methods.

If the current is not beyond the charge current limit, then at block 2506 the voltage of the source G1 is checked against an over-voltage threshold (V_Thresh). If the source G1 is over-voltage, then control is passed to block 2508; otherwise control is passed to block 2510. At block 2508 all of the system load's current as well as an extra amount to discharge the source G1 will be apportioned by the system, and control is passed to block 2518 where the necessary commands are sent to the individual EMCs.

If the source G1 is not over-voltage, then at block 2510 the State of Charge (SoC) is checked against a maximum limit (SoC_Thresh). If the SoC of the source is greater than the SoC_Thresh, then control is passed to block 2508; otherwise control is passed to block 2512. At block 2508 all of the system load's current as well as an extra amount to discharge the source G1 is apportioned by the system, and control is passed to block 2518 where the necessary commands for the apportionment are sent to the individual EMCs.

At block 2512, the automatic Timer is checked against a timeout parameter. If the Timer has accrued past the timeout parameter, then it is assumed that the system load's condition has existed for long enough and at block 2514 energy is sinked into the energy sources, such as batteries, and control is passed to block 2518 where any necessary commands are sent to the EMCs. If the Timer has not reached the timeout parameter, then at block 2516 the Timer is incremented and control is passed to block 2518. At block 2518 any pending apportionment commands are sent to the EMCs via the communications module 2122.

Figure 28:
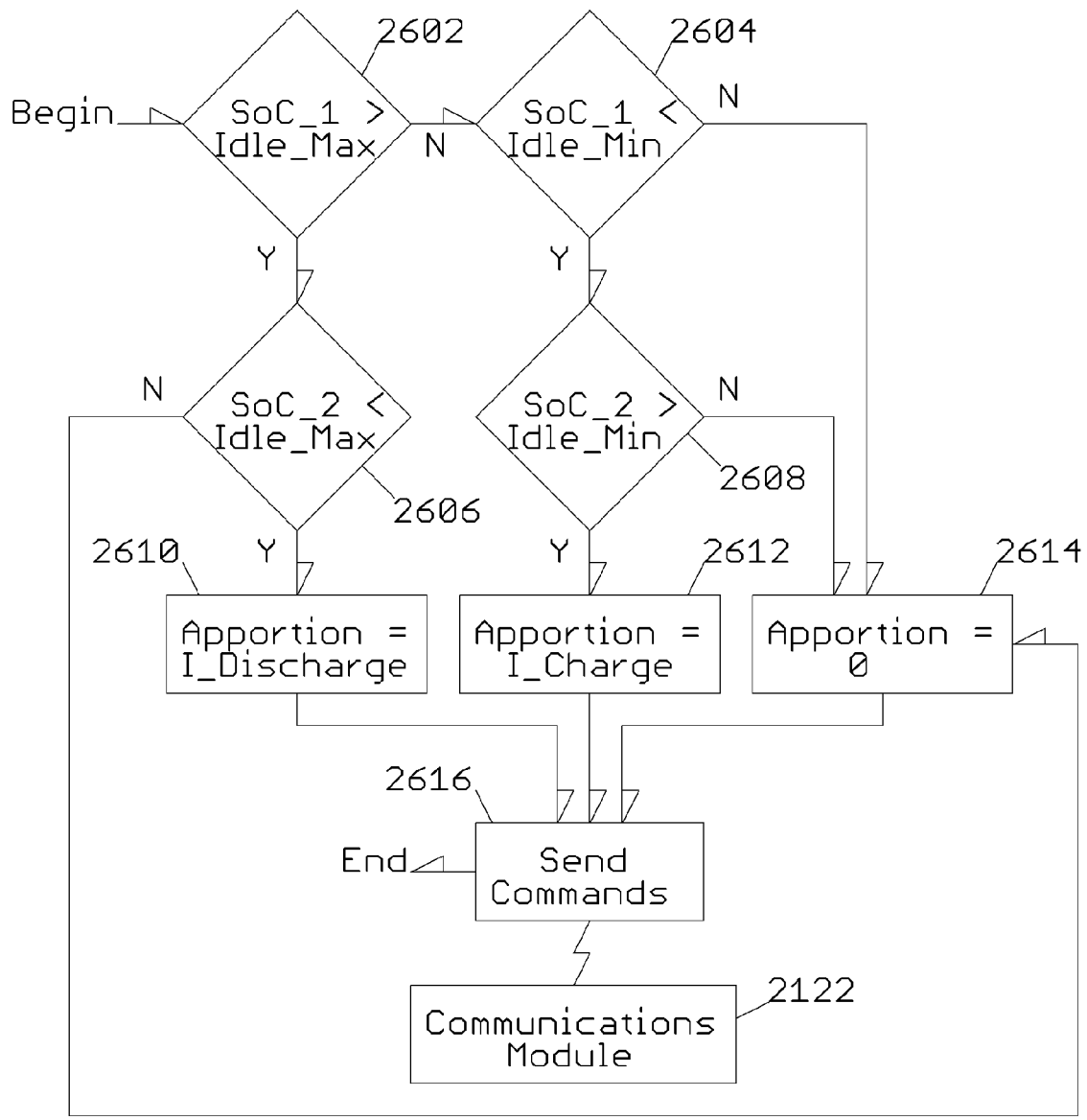
FIG. 28 shows an exemplary embodiment of an automatic balancing procedure.

FIG. 28 shows an exemplary embodiment of the automatic balancing procedure. In the description of this procedure, SoC_1 and SoC_2 are the State of Charge of sources G1 and G2, respectively. The value Idle_Max is the maximum State of Charge that is desired when the system is neither supplying to nor sourcing from the system load. The value Idle_Min is the minimum State of Charge that is desired when the system is neither supplying to nor sourcing from the system load. Initially, in block 2602, SoC_1 is compared to the Idle_Max value. If SoC_1 is greater than Idle_Max, control is passed to block 2606; otherwise control is passed to block 2604. In block 2604, SoC_1 is compared to the Idle Min value. If SoC_1 is less than Idle Min, control is passed to block 2608; otherwise control is passed to block 2614.

In block 2606, SoC_2 is compared to the Idle_Max value to see if G2 can accept extra charge from G1. If SoC_2 is less than Idle_Max, then control is passed to block 2610; otherwise control is passed to block 2614. In block 2610, a desired discharge current for G1 (I_Discharge) is apportioned among any connected modules and then control is passed to block 2616.

In block 2608, SoC_2 is compared to the Idle Min value to determine whether there is extra charge in G2 to transfer to G1. If SoC_2 is greater than Idle Min, then control is passed to block 2612; otherwise control is passed to block 2614. In block 2612 a desired charging current for G1 (I_Charge) is apportioned among the attached modules and then control is passed to block 2616.

At block 2614, zero current is apportioned and control is passed to block 2616.

At block 2616, any outstanding commands for apportionment are sent via the communications module 2122.

The communications bus 1904 (shown in FIG. 21) that couples the energy system management controller 1902 to the individual energy management controllers can be implemented in various ways. The communications bus 1904 can have multipoint bidirectional communications. Some examples of this type of communications would be Ethernet, RS-485, or I2C. The communications bus 1904 can also include bus collision detection, full duplex communications, noise immunity, and high bit-rate communications.

Figure 29:
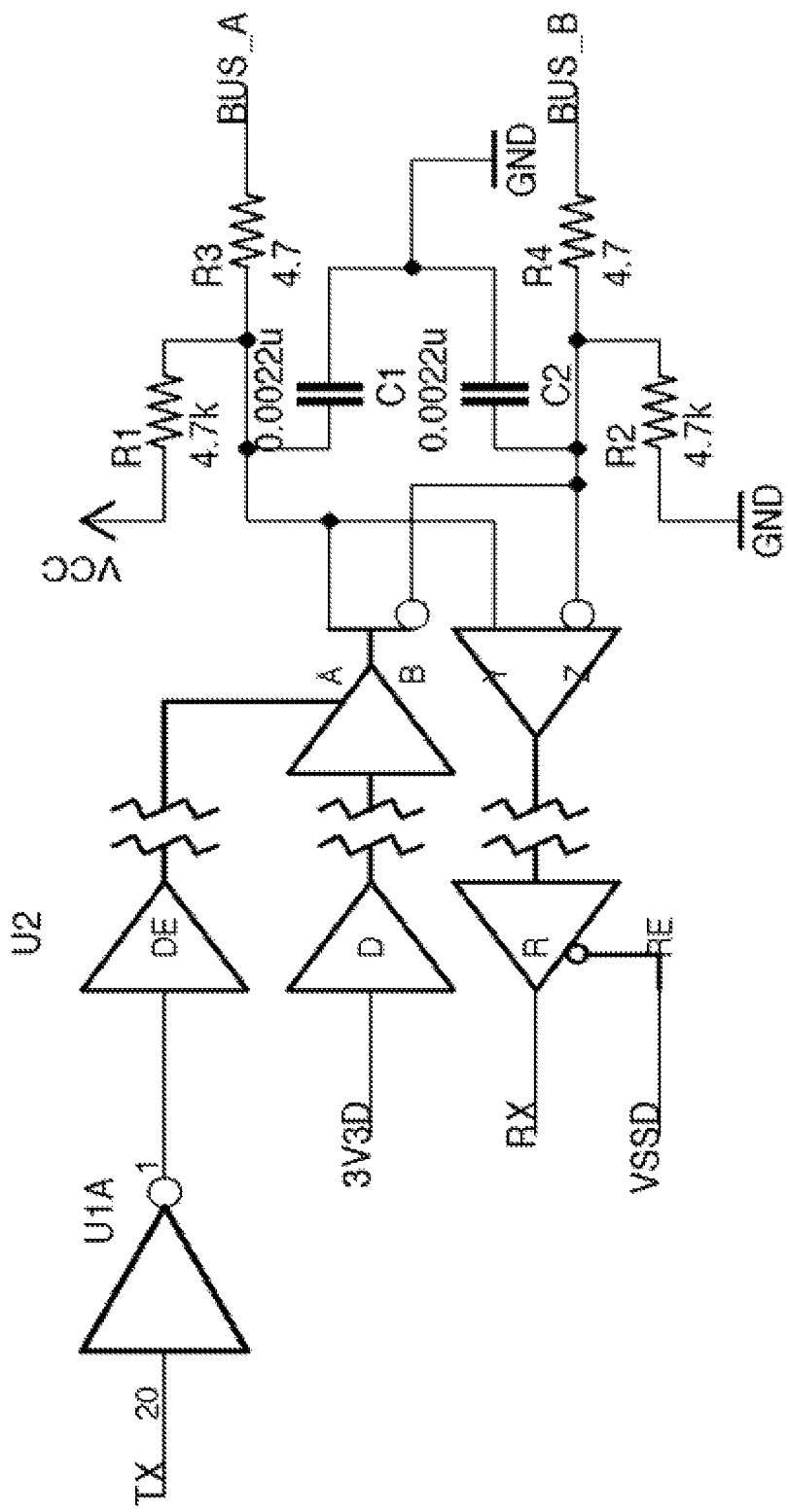
FIG. 29 shows an exemplary embodiment of a communications bus.

FIG. 29 shows an exemplary embodiment of the communications bus 1904. In this embodiment, the communications bus 1904 is a dominant mode RS-485 communications system. This embodiment supports multipoint communications, bus collision detection, noise immunity, and high bit-rate. This embodiment operates by only 'driving' the communications bus when the communications line is active. In other modes, the power supplies pull the communications bus 1904 to an idle state. Since the communications bus 1904 will idle to a particular state, any node along the communications bus 1904 can pull the bus into the dominant mode to signal data.

By utilizing a differential communications system, such as RS-485, improved noise immunity can be achieved. Bus_A of the communications bus 1904 carries the data signal and Bus_B carries the logical inverse of the data signal. Thus, the noise would have to affect the signals on Bus_A and Bus_B inversely to create a communications error. Typically electrical noise on communications creates a common-mode offset (or affects each signal in the same way), which is easily handled by the differential receiver.

The resistor R1 pulls Bus_A logically high, and R2 pulls Bus_B logically low. This provides the idle communications state. Resistor R3 and capacitor C1 create a low-pass filter to help suppress high frequency noise. Resistor R4 and capacitor C2 create a similar filter.

In the event that data is being transmitted, when the TX line is active (low), then the line is driven such that Bus_A is logically high and Bus_B is logically low. When the TX line is returned high, the bus will no longer be driven and will return to the idle state. By modulating the active and inactive states, data can be communicated between nodes.

Since data is looped back on the shared bus, the transmitter can monitor received data to verify that the data received is the same as the data transmitted. If this is not the case, then the transmitter knows that a bus collision has occurred, and will take appropriate measures to achieve arbitration of the bus. The RS-485 communications is electrically good up to and above 1 Mbps, which can support high bit-rate communications.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A method for controlling an energy management system that couples a system load to a first energy source and a second energy source, the system load being connected in parallel with the first energy source, the first energy source having a positive terminal and a negative terminal, the second energy source having a positive terminal and a negative terminal; the energy management system comprising an inductor extending from a first end to a second end, a first switch coupling the positive terminal of the first source to the first end of the inductor, a second switch coupling the negative terminal of the first source to the first end of the inductor, a third switch coupling the positive terminal of the second source to the second end of the inductor, and a fourth switch coupling the negative terminal of the second source to the second end of the inductor; the method comprising:
    evaluating conditions of the system load, the first energy source and the second energy source;
    determining the direction and proportion of energy flow between the first energy source, the second energy source and the system load;
    determining, based on the direction of energy flow between the first energy source, the second energy source and the system load, which of the first energy source, the second energy source and the system load is an energy flow source and which of the first energy source, the second energy source and the system load is an energy flow destination;
    selecting whether to use a two-switch state or a one switch state to move energy from the energy flow source to the energy flow destination; the two switch state closing either the first and fourth switches, the second and third switches or none of the switches at any one time; the one switch state closing only one of the switches or none of the switches at any one time;
    selecting whether to use a synchronous mode or an asynchronous mode to move energy from the energy flow source to the energy flow destination; and
    controlling the switching of the first, second, third and fourth switches to transfer energy from the energy flow source to the energy flow destination through the inductor using the selected one of the two-switch state or the one switch state, and of the synchronous mode or the asynchronous mode.

2. The method of claim 1, wherein the energy management system further comprises a first diode in parallel with the first switch, a second diode in parallel with the second switch, a third diode in parallel with the third switch, and a fourth diode in parallel with the fourth switch, and the method further comprising:
    when the two-switch state and synchronous mode are both selected, closing two switches to move energy from the energy flow source to the inductor and then opening those two switches and closing the other two switches to move energy from the inductor to the energy flow destination; and
    when the two-switch state and asynchronous mode are both selected, closing two switches to move energy from the energy flow source to the inductor and then opening those two switches to move energy from the inductor to the energy flow destination through two of the first, second, third and fourth diodes.

3. The method of claim 1, wherein the energy management system further comprises a first diode in parallel with the first switch, a second diode in parallel with the second switch, a third diode in parallel with the third switch, and a fourth diode in parallel with the fourth switch, and the method further comprising:
    determining a voltage of the energy flow source;
    determining a voltage of the energy flow destination;
    when the one-switch state is selected and the voltage of the energy flow source is less than the voltage of the energy flow destination, controlling the switching of the first, second, third and fourth switches to transfer energy between the energy flow source and the energy flow destination through the inductor using a boost conversion mode; and
    when the one-switch state is selected and the voltage of the energy flow source is not less than the voltage of the energy flow destination, controlling the switching of the first, second, third and fourth switches to transfer energy between the energy flow source and the energy flow destination through the inductor using a buck conversion mode.

4. The method of claim 3, further comprising:
    monitoring the voltage of the energy flow source;
    monitoring the voltage of the energy flow destination;
    when using the buck conversion mode and the voltage of the energy flow source becomes less than the voltage of the energy flow destination, switching from buck conversion mode to boost conversion mode.

5. A method for controlling an energy management system that couples a system load to a first energy source and a second energy source, the system load being connected in parallel with the first energy source, the first energy source having a positive terminal and a negative terminal, the second energy source having a positive terminal and a negative terminal; the energy management system comprising a plurality of energy management modules; each of the plurality of energy management modules comprising an inductor extending from a first end to a second end; a first switch coupling the positive terminal of the first source to the first end of the inductor; a second switch coupling the negative terminal of the first source to the first end of the inductor; a third switch coupling the positive terminal of the second source to the second end of the inductor; and a fourth switch coupling the negative terminal of the second source to the second end of the inductor, the method comprising:

evaluating conditions of the system load, the first energy source and the second energy source;

determining whether to control the energy management system using a manual mode or an automatic mode; and when controlling the energy management system using the manual mode:

receiving user input parameters defining the direction and proportion of energy flow between the first energy source, the second energy source and the system load;

controlling the switching of the first, second, third and fourth switches of each of the plurality of energy management modules to transfer energy in accordance with the user input parameters;

determining, based on the direction of energy flow between the first energy source, the second energy source and the system load, which of the first energy source, the second energy source and the system load is an energy flow source and which of the first energy source, the second energy source and the system load is an energy flow destination;

apportioning the energy flow between each of the plurality of energy management modules in accordance with the user input parameters;

for each of the plurality of energy management modules, selecting whether to use a two-switch state or a one switch state to move the apportioned amount of energy from the energy flow source to the energy flow destination;

for each of the plurality of energy management modules, selecting whether to use a synchronous mode or an asynchronous mode to move the apportioned amount of energy from the energy flow source to the energy flow destination; and controlling the switching of the first, second, third and fourth switches of each of the plurality of energy management modules to transfer energy from the energy flow source to the energy flow destination through the respective inductor using the selected one of the two-switch state or the one switch state, and of the synchronous mode or the asynchronous mode.

6. The method of claim 5, further comprising:

selecting N of the plurality of energy management modules to transfer energy between the first energy source and the second energy source;

synchronizing the switching of each of the N selected energy management modules to be out of phase with each other, such that if the time period for the switching of all of the energy management modules is T_sw, then controlling each energy management module to transfer energy for a period of T_sw/N, and offsetting the start time of each successive energy management module by T_sw/N.

7. The method of claim 5, further comprising:

detecting each of the plurality of energy management modules controlled by the energy management system.

8. The method of claim 5, further comprising:

receiving sensor readings indicating the condition of the system load, the first energy source and the second energy source;

using the sensor readings to evaluate the condition of the system load, the first energy source and the second energy source; and monitoring the sensor readings while controlling the switching of the first, second, third and fourth switches of each of the plurality of energy management modules.

9. The method of claim 5, wherein each of the plurality of energy management modules further comprises a first diode in parallel with the first switch, a second diode in parallel with the second switch, a third diode in parallel with the third switch, and a fourth diode in parallel with the fourth switch, and the method further comprises for each of the plurality of energy management modules:

when the two-switch state and synchronous mode are both selected, closing two switches of the energy management module to move energy from the energy flow source to the inductor of the energy management module, and then opening those two switches and closing the other two switches of the energy management module to move energy from the inductor of the energy management module to the energy flow destination; and when the two-switch state and asynchronous mode are both selected, closing two switches of the energy management module to move energy from the energy flow source to the inductor of the energy management module, and then opening those two switches and moving energy from the inductor of the energy management module to the energy flow destination through two of the first, second, third and fourth diodes of the energy management module.

10. The method of claim 5, wherein each of the plurality of energy management modules further comprises a first diode in parallel with the first switch, a second diode in parallel with the second switch, a third diode in parallel with the third switch, and a fourth diode in parallel with the fourth switch, and the method further comprises:

determining a voltage of the energy flow source;

determining a voltage of the energy flow destination;

when the one-switch state is selected and the voltage of the energy flow source is less than the voltage of the energy flow destination, for each of the plurality of energy management modules, controlling the switching of the first, second, third and fourth switches of the energy management module to transfer energy between the energy flow source and the energy flow destination through the inductor of the energy management module using a boost conversion mode; and when the one-switch state is selected and the voltage of the energy flow source is not less than the voltage of the energy flow destination, for each of the plurality of energy management modules, controlling the switching of the first, second, third and fourth switches of the energy management module to transfer energy between the energy flow source and the energy flow destination through the inductor of the energy management module using a buck conversion mode.

11. The method of claim 10, further comprising:

monitoring the voltage of the energy flow source;

monitoring the voltage of the energy flow destination;

when using the buck conversion mode and the voltage of the energy flow source becomes less than the voltage of the energy flow destination, for each of the plurality of energy management modules, switching from buck conversion mode to boost conversion mode.

12. A method for controlling an energy management system that couples a system load to a first energy source and a second energy source, the system load being connected in parallel with the first energy source, the first energy source having a positive terminal and a negative terminal, the second energy source having a positive terminal and a negative terminal; the energy management system comprising a plurality of energy management modules; each of the plurality of energy management modules comprising an inductor extending from a first end to a second end; a first switch coupling the positive terminal of the first source to the first end of the inductor; a second switch coupling the negative terminal of the first source to the first end of the inductor; a third switch coupling the positive terminal of the second source to the second end of the inductor; and a fourth switch coupling the negative terminal of the second source to the second end of the inductor, the method comprising:

evaluating conditions of the system load, the first energy source and the second energy source;

determining whether to control the energy management system using a manual mode or an automatic mode; and when controlling the energy management system using the automatic mode:

determining the direction and proportion of energy flow between the first energy source, the second energy source and the system load;

determining, based on the direction of energy flow between the first energy source, the second energy source and the system load, which of the first energy source, the second energy source and the system load is an energy flow source and which of the first energy source, the second energy source and the system load is an energy flow destination;

apportioning the energy flow between each of the plurality of energy management modules;

for each of the plurality of energy management modules, selecting whether to use a two-switch state or a one switch state to move the apportioned amount of energy from the energy flow source to the energy flow destination; the two switch state closing either the first and fourth switches, the second and third switches or none of the switches at any one time; the one switch state closing only one of the switches or none of the switches at any one time;

for each of the plurality of energy management modules, selecting whether to use a synchronous mode or an asynchronous mode to move energy from the energy flow source to the energy flow destination; and controlling the switching of the first, second, third and fourth switches of each of the plurality of energy management modules to transfer energy from the energy flow source to the energy flow destination through the respective inductor using the selected one of the two-switch state or the one switch state, and of the synchronous mode or the asynchronous mode.

13. The method of claim 12, wherein determining the direction and proportion of energy flow between the first energy source and the second energy source and the system load comprises:

determining whether the system load is using energy from the first and second energy sources;

determining whether the system load is supplying energy to the first and second energy sources; and when the system load is neither using nor supplying energy, determining whether to perform energy balancing between the first and second energy sources.

14. The method of claim 13 wherein, when it is determined that the system load is using energy from the first and second energy sources, the method further comprises:

determining whether the amount of current to be supplied to the system load is greater than a threshold current, and setting apportionment of the energy flow from the first and second energy sources to the system load accordingly;

determining whether at least one of a voltage of the first energy source is less than a threshold voltage and a state-of-charge of the first energy source is less than a threshold state-of-charge, and apportioning the energy flow from the first and second energy sources to the system load accordingly; and when none of the threshold current, the threshold voltage and the threshold state-of-charge are exceeded, comparing a timer to a timeout value.

15. The method of claim 13, wherein when it is determined that the system load is supplying energy to the first and second energy sources, the method further comprises:

determining whether the amount of current to be supplied by the system load is greater than a threshold current, and setting apportionment of the energy flow from the system load to the first and second energy sources accordingly;

determining whether at least one of a voltage of the first energy source is greater than a threshold voltage and a state-of-charge of the first energy source is greater than a threshold state-of-charge, and apportioning the energy flow from the system load to the first and second energy sources accordingly;

when none of the threshold current, the threshold voltage and the threshold state-of-charge are exceeded, comparing a timer to a timeout value.

16. The method of claim 13, wherein when it is determined to perform energy balancing between the first and second energy sources, the method further comprises:

determining a state-of-charge of the first energy source;
determining a state-of-charge of the second energy source;
comparing the state-of-charge of the first energy source to maximum and minimum state-of-charge values;
comparing the state-of-charge of the second energy source to maximum and minimum state-of-charge values;
apportioning the energy flow between the first energy source and the second energy sources based on the comparisons with the maximum and minimum state-of-charge values.

17. The method of claim 12, further comprising:
selecting N of the plurality of energy management modules to transfer energy between the first energy source and the second energy source;
synchronizing the switching of each of the N selected energy management modules to be out of phase with each other, such that if the time period for the switching of all of the energy management modules is T_sw, then controlling each energy management module to transfer energy for a period of T_sw/N, and offsetting the start time of each successive energy management module by T_sw/N.

18. The method of claim 12, further comprising:
detecting each of the plurality of energy management modules controlled by the energy management system.

19. The method of claim 12, further comprising:
receiving sensor readings indicating the condition of the system load, the first energy source and the second energy source;
using the sensor readings to evaluate the condition of the system load, the first energy source and the second energy source; and
monitoring the sensor readings while controlling the switching of the first, second, third and fourth switches of each of the plurality of energy management modules.

20. The method of claim 12, wherein each of the plurality of energy management modules further comprises a first diode in parallel with the first switch, a second diode in parallel with the second switch, a third diode in parallel with the third switch, and a fourth diode in parallel with the fourth switch, and the method further comprises for each of the plurality of energy management modules:

when the two-switch state and synchronous mode are both selected, closing two switches of the energy management module to move energy from the energy flow source to the inductor of the energy management module, and then opening those two switches and closing the other two switches of the energy management module to move energy from the inductor of the energy management module to the energy flow destination; and when the two-switch state and asynchronous mode are both selected, closing two switches of the energy management module to move energy from the energy flow source to the inductor of the energy management module, and then opening those two switches to move energy from the inductor of the energy management module to the energy flow destination through two of the first, second, third and fourth diodes of the energy management module.

21. The method of claim 12, wherein each of the plurality of energy management modules further comprises a first diode in parallel with the first switch, a second diode in parallel with the second switch, a third diode in parallel with the third switch, and a fourth diode in parallel with the fourth switch, and the method further comprises:

determining a voltage of the energy flow source;
determining a voltage of the energy flow destination;
when the one-switch state is selected and the voltage of the energy flow source is less than the voltage of the energy flow destination, for each of the plurality of energy management modules, controlling the switching of the first, second, third and fourth switches of the energy management module to transfer energy between the energy flow source and the energy flow destination through the inductor of the energy management module using a boost conversion mode; and when the one-switch state is selected and the voltage of the energy flow source is not less than the voltage of the energy flow destination, for each of the plurality of energy management modules, controlling the switching of the first, second, third and fourth switches of the energy management module to transfer energy between the energy flow source and the energy flow destination through the inductor of the energy management module using a buck conversion mode.

22. The method of claim 21, further comprising:
monitoring the voltage of the energy flow source;
monitoring the voltage of the energy flow destination;
when using the buck conversion mode and the voltage of the energy flow source becomes less than the voltage of the energy flow destination, for each of the plurality of energy management modules, switching from buck conversion mode to boost conversion mode.

* * * * *